(12) United States Patent
Aila et al.

(10) Patent No.: US 8,970,584 B1
(45) Date of Patent: Mar. 3, 2015

(54) BOUNDING BOX-BASED TECHNIQUES FOR IMPROVED SAMPLE TEST EFFICIENCY IN IMAGE RENDERING

(75) Inventors: Timo Aila, Helsinki (FI); Jaakko Lehtinen, Helsinki (FI); Peter Shirley, Santa Clara, CA (US); Samuli Laine, Helsinki (FI)

(73) Assignee: Nvidia Corporation, Santa Clara, CA (US)

( * ) Notice: Subject to any disclaimer, the term of this patent is extended or adjusted under 35 U.S.C. 154(b) by 573 days.

(21) Appl. No.: 13/168,771

(22) Filed: Jun. 24, 2011

(51) Int. Cl.
*G06T 17/00* (2006.01)
*G06T 13/00* (2011.01)
*G09G 5/00* (2006.01)

(52) U.S. Cl.
USPC ............ 345/420; 345/473; 345/622; 345/581

(58) Field of Classification Search
None
See application file for complete search history.

(56) References Cited

U.S. PATENT DOCUMENTS

| | | |
|---|---|---|
| 4,897,806 A | 1/1990 | Cook et al. |
| 5,113,493 A | 5/1992 | Crosby |
| 5,222,203 A | 6/1993 | Obata |
| 5,239,624 A | 8/1993 | Cook et al. |
| 5,289,565 A | 2/1994 | Smith et al. |
| 5,299,298 A | 3/1994 | Elmquist et al. |
| 5,357,579 A | 10/1994 | Buchner et al. |
| 5,384,667 A | 1/1995 | Beckwith |
| 5,402,534 A | 3/1995 | Yeomans |
| 5,465,119 A | 11/1995 | Demos |
| 5,684,935 A | 11/1997 | Demesa, III et al. |
| 5,737,027 A | 4/1998 | Demos |
| 5,809,219 A | 9/1998 | Pearce et al. |
| 5,870,096 A | 2/1999 | Anjyo et al. |
| 5,973,700 A | 10/1999 | Taylor et al. |
| 6,034,667 A | 3/2000 | Barrett |
| 6,211,882 B1 | 4/2001 | Pearce et al. |
| 6,300,956 B1 | 10/2001 | Apodaca et al. |
| 6,618,048 B1 | 9/2003 | Leather |
| 6,636,214 B1 | 10/2003 | Leather et al. |
| 6,700,586 B1 | 3/2004 | Demers |
| 6,707,458 B1 | 3/2004 | Leather et al. |
| 6,717,577 B1 | 4/2004 | Cheng et al. |
| 6,720,975 B1 | 4/2004 | Dietrich, Jr. |
| 6,811,489 B1 | 11/2004 | Shimizu et al. |

(Continued)

FOREIGN PATENT DOCUMENTS

| | | |
|---|---|---|
| CN | 1856805 | 11/2006 |
| WO | 2012115711 | 8/2012 |

OTHER PUBLICATIONS

P. Haberli and K. Akeley, "The Accumulation Buffer: Hardware Support for High Quality Rendering," In Proc. SIGGRAPH 1990. pp. 309-318.

(Continued)

*Primary Examiner* — Ryan R Yang

(57) ABSTRACT

A bounding box-based method for reducing the number of samples tested for rendering a screen space region of an image includes determining a trajectory of a primitive in screen space for an image which is to be rendered and constructing an axis-aligned bounding box for the screen space region. The axis-aligned bounding box includes a bound in a non-screen dimension that is defined as a function of the screen space trajectory of the primitive, and overlaps a portion of the screen space region. One or more sample points which are located within the screen space region, and which are not overlapped by the axis-aligned bounding box are excluded from testing.

20 Claims, 10 Drawing Sheets

(56) References Cited

U.S. PATENT DOCUMENTS

| | | | |
|---|---|---|---|
| 6,867,781 B1 | 3/2005 | Van Hook et al. |
| 6,885,384 B2 | 4/2005 | Deering et al. |
| 6,999,100 B1 | 2/2006 | Leather et al. |
| 7,002,591 B1 | 2/2006 | Leather et al. |
| 7,034,828 B1 | 4/2006 | Drebin et al. |
| 7,050,066 B2 | 5/2006 | Ohta |
| 7,061,502 B1 | 6/2006 | Law et al. |
| 7,075,545 B2 | 7/2006 | Van Hook et al. |
| 7,119,813 B1 | 10/2006 | Hollis et al. |
| 7,133,041 B2 | 11/2006 | Kaufman et al. |
| 7,133,047 B2 | 11/2006 | Pallister |
| 7,136,081 B2 | 11/2006 | Gritz et al. |
| 7,176,919 B2 | 2/2007 | Drebin et al. |
| 7,184,059 B1 | 2/2007 | Fouladi et al. |
| 7,187,379 B2 | 3/2007 | Keller |
| 7,196,710 B1 | 3/2007 | Fouladi et al. |
| 7,205,999 B2 | 4/2007 | Leather |
| 7,230,618 B2 | 6/2007 | Keller |
| 7,307,638 B2 | 12/2007 | Leather et al. |
| 7,307,640 B2 | 12/2007 | Demers et al. |
| 7,317,459 B2 | 1/2008 | Fouladi et al. |
| 7,362,332 B2 | 4/2008 | Gritz |
| 7,446,780 B1 | 11/2008 | Everitt et al. |
| 7,453,460 B2 | 11/2008 | Keller |
| 7,453,461 B2 | 11/2008 | Keller |
| 7,477,261 B2 | 1/2009 | Pallister |
| 7,483,010 B2 | 1/2009 | Bai et al. |
| 7,499,054 B2 | 3/2009 | Keller |
| 7,538,772 B1 | 5/2009 | Fouladi et al. |
| 7,576,748 B2 | 8/2009 | Van Hook et al. |
| 7,616,200 B1 | 11/2009 | Heinrich et al. |
| 7,623,726 B1 | 11/2009 | Georgiev |
| 7,697,010 B2 | 4/2010 | Pallister |
| 7,701,461 B2 | 4/2010 | Fouladi et al. |
| 7,742,060 B2 | 6/2010 | Maillot |
| 7,961,970 B1 | 6/2011 | Georgiev |
| 7,973,789 B2 | 7/2011 | Cook |
| 7,995,069 B2 | 8/2011 | Van Hook et al. |
| 8,098,255 B2 | 1/2012 | Fouladi et al. |
| 2003/0234789 A1* | 12/2003 | Gritz ........................ 345/474 |
| 2011/0090337 A1 | 4/2011 | Klomp et al. |
| 2012/0218264 A1* | 8/2012 | Clarberg et al. ............. 345/420 |
| 2012/0293515 A1* | 11/2012 | Clarberg et al. ............. 345/441 |

OTHER PUBLICATIONS

Tomas Akenine-Möller, Jacob Munkberg, and Jon Hasselgren, "Stochastic rasterization using time-continuous triangles," Proc. Graphics Hardware 2009.

Kayvon Fatahalian, Edward Luong, Solomon Boulos, Kurt Akeley, William R. Mark, and Pat Hanrahan, "Data-Parallel Rasterization of Micropolygons with Defocus and Motion Blur," Proc. High Performance Graphics 2009.

Moller., et al., "Stochastic Rasterization Using Time-Continuous Triangles," ACM, Jan. 2007, pp. 1-11.

Hou, Q., et al, "Micropolygon Ray Tracing with Defocus and Motion Blur," ACM Transactions on Graphics (TOG), vol. 29, Article 64, Jul. 2010, pp. 1-10.

Laine, S., et al., "Clipless Dual-Space Bounds for Faster Stochastic Rasterization," ACM Transactions on Graphics (TOG), vol. 30, Issue 4, Article 106, Jul. 2011, pp. 1-6.

* cited by examiner

BOUNDING BOX-BASED TECHNIQUES FOR IMPROVED SAMPLE TEST EFFICIENCY IN IMAGE RENDERING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

This application is concurrently filed with the following commonly-owned patent applications, each of which is incorporated by reference in its entirety for all purposes:

U.S. patent application Ser. No. 13/168,765, filed Jun. 24, 2011, entitled "System and Method for Improved Sample Test Efficiency in Image Rendering,"; and U.S. patent application Ser. No. 13/168,784, filed Jun. 24, 2011, entitled "Clipless Time and Lens Bounds for Improved Sample Test Efficiency in Image Rendering,".

BACKGROUND

The present invention relates to image rendering, and more particularly to improving sample test efficiency in image rendering applications.

The rendering of a high quality image relies upon an accurate color computation for each pixel forming the image. The accuracy of this color computation is improved by distributing sample points across each pixel, testing which sample points are overlapped by a primitive which is to be rendered in the image, and computing a color for the pixel based upon those overlapped and non-overlapped sample points.

Sample testing algorithms (sometimes referred to as "point in polygon tests") determine which samples of a screen space region (usually a pixel) are overlapped by a primitive, and the quality of such algorithms can be based upon their "sample test efficiency" (STE), this term referring to the number of sample points overlapped by a primitive versus the number of sample points tested for a given screen space region, e.g. a pixel. A high STE indicates an efficient sample testing algorithm, as a high percentage of the test sample points were actually or possibly overlapped by the primitive.

Techniques for improving STE are useful in the contexts of motion blur and depth of field rendering effects, as both types of effects involve a primitive potentially traversing a large number of pixels, resulting in a potentially large number of sample points which have to be considered for testing.

Motion blur results when the camera and/or geometry move while the virtual camera shutter is open. While the motion can theoretically be arbitrary during the exposure of a frame, it has been observed in film industry that vertex motion can often be satisfactorily simplified by assuming linear motion between shutter open (t=0) and closed (t=1).

In stochastic rasterization, the frame buffer is generalized so that each sample has additional properties in addition to the screen-space (x,y) position. In order to support motion blur, a time value is assigned to each frame buffer sample. In absence of motion, the frame buffer behaves exactly as it does currently, providing spatial antialiasing. With motion, a sample is updated only when a triangle overlaps the sample at the time of the sample.

The prior art describes several ways of interpolating a triangle to a specified time. One approach is as described in "The Accumulation Buffer: Hardware Support for High Quality Rendering," P. Haberli and K. Akeley, Proc. SIGGRAPH 1990, pgs. 309-318, and in "Data-Parallel Rasterization of Micropolygons with Defocus and Motion Blur," K. Fatahalian, E. Luong, S. Boulos, K. Akeley, W. Mark, and P. Hanrahan, Proc. High Performance Graphics 2009. This approach involves interpolating the vertices of a primitive in homogeneous clip space before triangle setup, and therefore a separate triangle setup/rendering pass is required for each distinct time. While simple to implement, this approach may not scale to a large number of samples per pixel, and the image quality can suffer due to a fixed (typically small) set of unique time values.

A second conventional approach has been to identify the screen-space bounds for the "time-continuous triangle" (TCT) for the entire exposure time, and then test all samples in all covered pixels by interpolating the triangle to the current sample's time, as described in disclosed in "Stochastic rasterization using time-continuous triangles," T. Akenine-Möller, J. Munkberg, and J. Hasselgren, Proc. Graphics Hardware 2009. Possible implementations include at least time-continuous edge functions (about 3× the cost of traditional 2D edges) and ray-triangle intersection. TCTs offer high image quality because a unique time value can be set to each sample, but an accompanying disadvantage is low STE. When a triangle moves quickly, it can cover a relatively large region on the screen, yet at the same time we expect it to cover approximately a constant number of samples regardless of motion. STE therefore degrades drastically for fast motion, and can be as low as 1% in realistic cases.

A third approach is described in U.S. Pat. No. 4,897,806, whereby exposure time is split into several strata (typically, the number of strata equals the number of samples per pixel), and the above-mentioned second approach is called for each strata. This improves STE significantly, but the efficiency of the solution is not optimal for the low sampling densities typically encountered in fast rendering graphics (4-16 samples/pixel).

In view of the shortcomings of the conventional approaches, a new method for providing improved sample test efficiency in image rendering is needed.

SUMMARY

A system, method, and computer program product for reducing the number of samples tested for rendering a screen space region of an image is presented herein. The method includes determining a trajectory of a primitive in screen space for an image which is to be rendered and constructing an axis-aligned bounding box for the screen space region. The axis-aligned bounding box includes a bound in a non-screen dimension that is defined as a function of the screen space trajectory of the primitive, and the bounding box overlaps a portion of the screen space region. One or more sample points which are located within the screen space region, and which are not overlapped by the axis-aligned bounding box are excluded from testing.

The foregoing method finds particular application in the rendering of images, an exemplary method of which includes the aforementioned operations, and the additional operations of identifying a screen space region which is to be rendered, testing sample points which are located within the screen space region and which are overlapped by the AABB of the primitive, and rendering the screen space region based upon the tested sample points.

These and other features of the invention will be better understood in view of the following drawings and detailed description of exemplary embodiments.

For clarity, previously described features retain their reference indices in subsequent figures.

DETAILED DESCRIPTION OF EXEMPLARY EMBODIMENTS

As an initial starting point for the description of the present invention, per-vertex motion vectors (mv) of a primitive, e.g., a triangle, are assumed to be affine, i.e. 2D. Under this assumption, the screen-space positions of vertices during exposure can be defined as:

$$pos_{t=0} + t*mv \qquad \text{(eq. 1)}$$

where $pos_{t=0}$ is the position of the vertices at t=0.

Assuming the motion is affine, it follows that primitive's bounding volume can be determined separately for t=0 and t=1, and its extents interpolated linearly. As such, the bounding volume is guaranteed to contain the time-continuous triangle (or any other geometric primitive) at all times. It is therefore possible to solve the minimum and maximum time the bounding volume may overlap a tile on the screen. Once the $[t_{min}, t_{max}]$ range for a tile (e.g., a pixel or any region of an image which is to be rendered) is determined, only the samples which fall within this range need to be tested. If the samples inside a tile are arranged according to increasing time, and use stratified sampling, a relatively small set of samples may be found that are potentially overlapped by the triangle. Samples which are within the tile, but which are not overlapped by the bounding volume can be excluded from testing, thus improving the sample test efficiency for rendering the region of the image.

As used herein, the term "screen space" refers to the conventionally-known screen space of the image, the space being defined in the convention in the (x,y) dimension coordinate system. The term "non-screen space" refers to a space which is not included in the screen space of the image. Examples of such spaces/dimensions include time (t) and lens dimensions (u,v).

Primitive Approximation using Bounding Rectangles

Figure 1A:
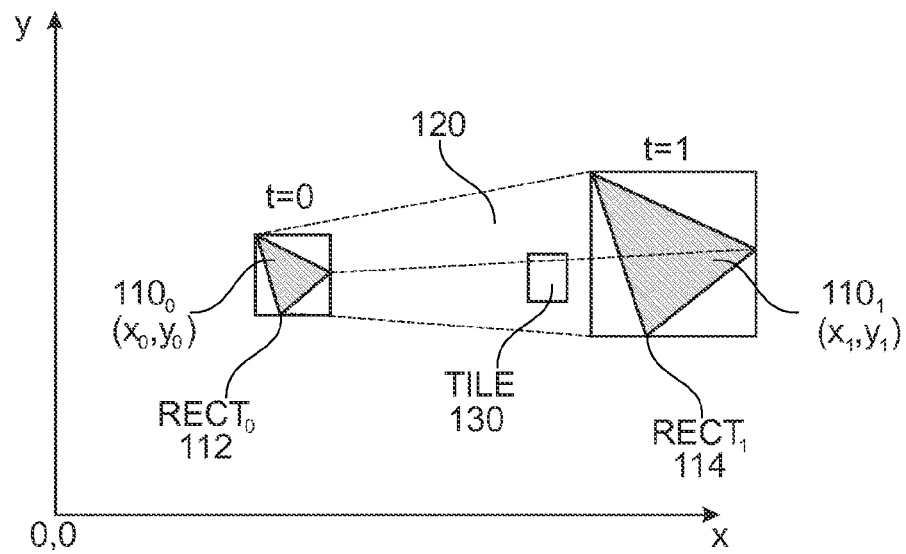
FIGS. 1A and 1B illustrates a triangle moving in screen space as a function of time in accordance with the present invention.
Figure 1B:
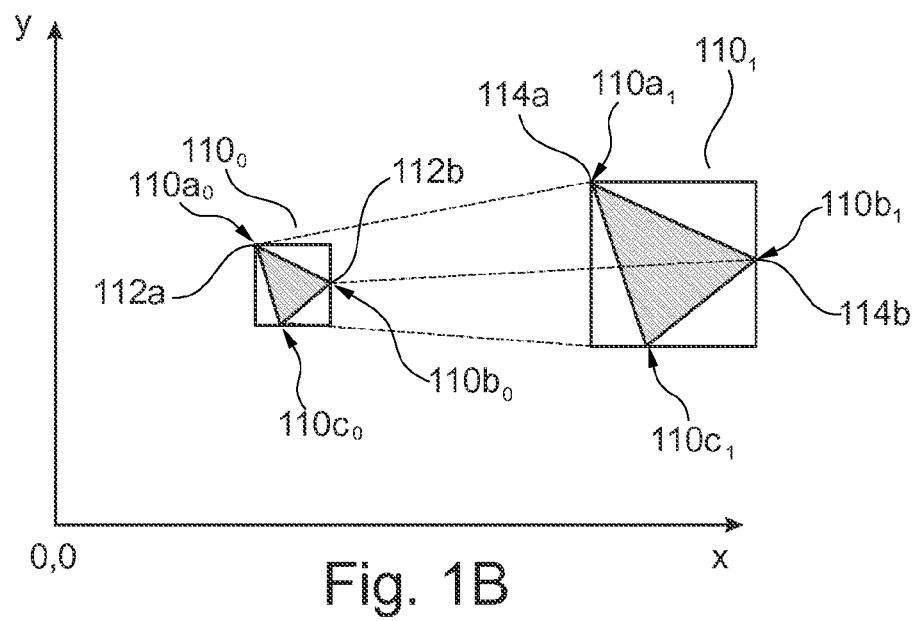

FIGS. 1A and 1B illustrates a triangle shown in screen space in accordance with the present invention. FIGS. 1A and 1B both illustrate the same triangle, although different features are illustrated in each for greater clarity. As can be seen, triangle $110_0$ is smaller than triangle $110_1$, an effect which is due to the triangle 110 approaching the camera/eye point in the illustrated embodiment. In general, the triangle 110 (or any other primitive) may undergo a change in size and/or orientation during the time span t=0 to t=1 in accordance with the present invention.

The triangle 110 is shown at position $(x_0,y_0)$ at time index t=0, and position $(x_1,y_1)$ at time index t=1, the triangle 110 identified with the references $110_0$ and $110_1$ to indicate their respective time indices. The triangle 110 undergoes motion during the time interval t=0 and t=1, the term "motion" or "screen space motion" referring to both actual motion of a primitive or apparent motion of the primitive. Screen space motion of the triangle illustrated in FIGS. 1A and 1B is an embodiment of actual motion, that is, the triangle's motion in screen space occurs as a function of time, and not as a result of viewing the triangle from different lens positions (u,v), an example of which is described below.

The triangle's motion is further characterized as having a trajectory 120 extending between the triangles $110_0$ and $110_1$. As used herein, the trajectory 120 determines a region on the screen for any (u,v,t) coordinates, so that the screen space region bounds the primitive at those particular (u,v,t) coordinates. As such, the trajectory 120 includes screen space dimensions (x,y) and at least one non-screen space dimension (u,v, t). As illustrated, the trajectory 120 defines the possible screen space paths along which the triangle 110 can take during the time span t=0 to t=1. The triangle 110 may include lens dimension coordinates (u,v) alternative or in addition to the time dimension (t). The trajectory 120 is shown as affine motion, although over types of motion, e.g., perspective correct motion, may be implemented as well in accordance with the present invention. Further, when the triangle/primitive is approximate using bounding structures (exemplary, bounding rectangles or triangles described below), the trajectory 120 refers to the extents of those bounding structures.

As shown, the trajectory 120 intersects a screen space region 130 (referred to herein as a "tile" for brevity), which may be any region in the screen space which is to be rendered, e.g., a pixel whose color/reflectance/transmittance is to be determined. The trajectory's intersection of the tile 130 indicates that the triangle may (but not necessarily) intersect the tile. The goal for this particular embodiment is to determine over what time range $[t_{min}, t_{max}]$ (or "t-bounds" as referred to herein) the triangle 110 possibly intersects or overlaps the tile 130, and to limit the testing to those samples which are overlapped by that t-bounds. This determination can be separated into two one-dimensional tests: the triangle 110 needs to overlap the tile 130 simultaneously horizontally and vertically in the (x,y) screen space. The horizontal and vertical time spans can be determined separately for horizontal and vertical movement, and an intersection between the two taken. As can be understood, each of the samples also include a non-screen space index, and in the present invention, the samples are arranged according to the screen space location, as well as their non-screen space index, e.g, time t or lens position (u, v).

As shown in FIG. 1B, each of the triangles $110_0$ and $110_1$ includes a minimum and a maximum vertex for each of the x and y planes, where the terms "minimum" and "maximum" are relative to the vertices composing that triangle, and to the vertex's position relative to a predefined origin point of the x,y coordinate system. In the illustrated embodiment, triangle $110_0$ includes vertices $110a_0$, $110b_0$, and $110c_0$. For this triangle, vertex $110a_0$ represents the minimum vertex in the x-plane and the maximum vertex in the y-plane, vertex $110b_0$ represents the maximum vertex in the x-plane, and vertex $110c_0$ represents the minimum vertex in the y-plane. For triangle $110_1$, vertex $110a_1$ represents the minimum vertex in the x-plane and the maximum vertex in the y-plane, vertex $110b_1$ represents the maximum vertex in the x-plane, and vertex $110c_1$ represents the minimum vertex in the y-plane.

Bounding structures (illustrated in the form of bounding rectangles) $RECT_0$ and $RECT_1$ 112 and 114 are used to approximate respective triangles $110_0$ and $110_1$. Each of the bounding rectangles $RECT_0$ 112 and $RECT_1$ 114 includes low (LO) and high (HI) extents (points) for each of the x- and y-planes, these extents corresponding to the afore-described minimum and maximum vertices. For the x-plane, $RECT_0$ has a low extent 112a corresponding to the minimum x-plane vertex $110a_0$, and a high extent 112b corresponding to maximum x-plane vertex $110b_0$. Similarly, $RECT_1$ has a low extent 114a corresponding to the minimum x-plane vertex $110a_1$, and a high extent 114b corresponding to maximum x-plane vertex $110b_1$. Although the same vertex of the triangle 110 operates as the low extent vertices 112a, 114a at each of the time points t=0 and t=1 (i.e., vertex 110a for the low side and vertex 110b for the high side), this is not necessarily the case, e.g. if the triangle 110 undergoes rotation or other change in orientation during the time spam t=0 to t=1. In a further exemplary embodiment, the bounding structure is a bounding triangle, described and illustrated below.

For the y-plane, the $RECT_0$ and $RECT_1$ would have low and high extents corresponding to the bottom and top of those boxes, respectively. In the illustrated embodiment, triangle 110 overlaps the tile 130 over the entire time span, i.e., the y/vertical extents of the triangle 110 overlap the tile 130 at each of the time points t=0 and t=1, and thus computing the overlap time for the triangle 110 in the x-plane is determinative in this example. In another embodiment in which the triangle 110 enters the tile along the y-direction after time $t_{min}$, that later entry time would re-define the $t_{min}$ point. Similarly if the triangle 110 exits the tile along the y-direction before time $t_{max}$, that earlier exit time would re-define the $t_{max}$ point.

As noted, the triangle 110 needs to overlap the tile 130 simultaneously horizontally and vertically in the (x,y) screen space. The time spans can be determined separately for horizontal and vertical movement, and an intersection between the two taken. Assuming the intersection of the two time spans exists (i.e., not a null set), the intersection of the two time spans represents the time extent of the collective bounding volume for the triangle. If the intersection of the two time spans is a null set, the triangle does not extend over the tile, and thus all of the sample points included in the tile can be excluded from testing.

It will be understood by the skilled person that the foregoing example applies equally to a description of a primitive with respect to horizontal and vertical lens dimensions (u,v), as viewing the primitive from different lens positions (u,v) will result in apparent motion of the primitive in the screen space, such apparent motion intersecting the tile 130. In this case, each frame buffer sample point is further indexed with a lens position (u, v). Depth of field is related to motion blur in the sense that when the viewing position on the lens is moved to the left or the right, this causes only horizontal movement of the vertices, and similarly for vertical movement. That is, a change in the horizontal lens coordinate (u) results in apparent movement of the primitive only in the horizontal direction, and a change in vertical lens coordinate (v) results in apparent movement of the primitive only in the vertical direction.

Figure 1C:
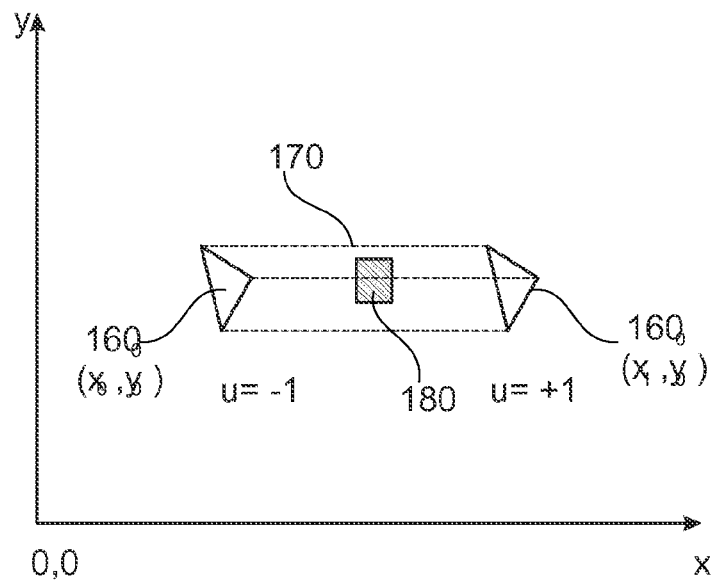
FIG. 1C illustrates a triangle exhibiting apparent motion in screen space as a function of horizontal lens dimension (u) in accordance with the present invention.

FIG. 1C illustrates a triangle exhibiting apparent motion in screen space as a function of horizontal lens dimension (u) in accordance with the present invention. Triangle 160 is shown at each of two x-positions ($x_0$) and ($x_1$) relative to two different horizontal lens positions u=−1 and u=+1, the triangle 160 identified with the references $160_0$ and $160_1$ to indicate their respective lens positions. The screen space motion of the triangle is "apparent" in this instance, as the triangle does not actual move in time, but rather its position is shifted, depending upon the lens position (u) from which it is viewed. Further particularly, the triangle 160 exhibits a screen space trajectory 170 which intersects the screen space region/tile 180 over some range of the horizontal lens dimension (u) which is to be solved.

Figure 2:
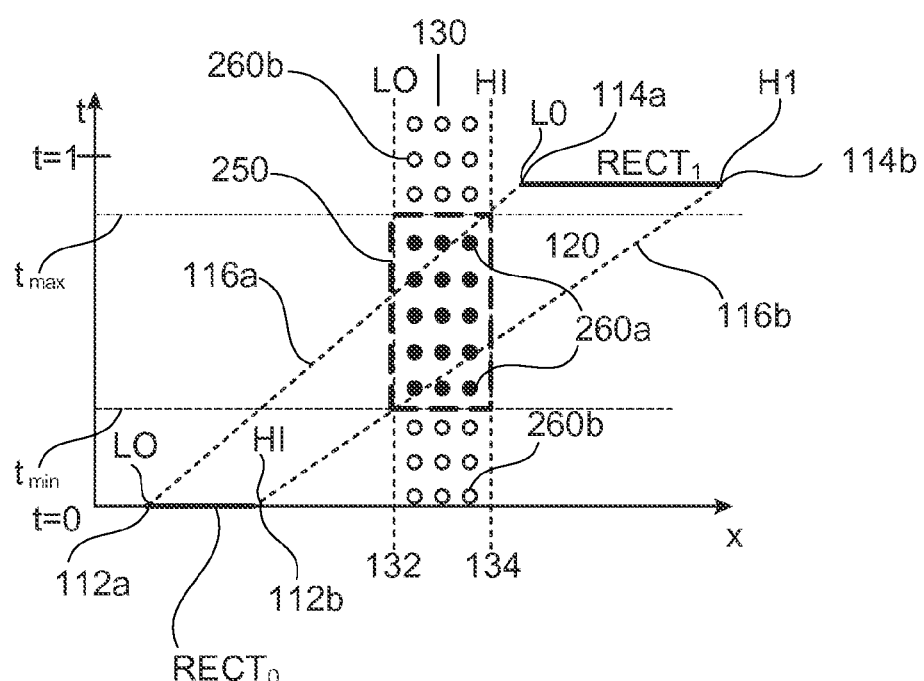
FIG. 2 illustrates the construction of an axis-aligned bounding box utilizing the trajectory of a primitive in accordance with the present invention.

FIG. 2 illustrates the construction of a bounding volume in utilizing the trajectory of a primitive in accordance with the present invention. The bounding volume is in the form of an axis-aligned bounding box (referred to the synonym "AABB" herein for brevity). The AABB describes a structure which envelopes or contains the primitive over a range of motion (actual or apparent), with said bounding structure also being aligned to the coordinate system in which it is represented, e.g., the extents of the bounding structure are aligned in each of the screen space coordinate (illustrated as the x-dimension) and the non-screen space coordinate (illustrated as the time dimension). Exemplary, the AABB is a geometry of two or more dimensions. Further particularly, the AABB 250 is formed per tile 130, and includes screen space bounds (shown as the extents of the tile 130 $TILE_{LO}$ 132 and $TILE_{HI}$ 134) and the non-screen space bounds (shown as t-bounds $t_{min}$ and $t_{max}$). In particular, the non-screen space bounds of the bounding volume are determined as a function of the primitive's trajectory in screen space, as will be described below.

The primitive trajectory 120 shown in FIG. 2 represents the (t,x) plane of the primitive's trajectory shown in FIGS. 1A and 1B. The primitive trajectory 120 is constructed according to one embodiment as follows. The trajectory's horizontal high and low extents (LO, HI) in screen space are determined at t=0 and t=1, i.e., extents 112a and 112b are determined for triangle 110$_0$ and extents 114a and 114b are determined for triangle 110$_1$, as shown in FIG. 1B. Assuming affine motion vectors, $RECT_{0,LO}$ interpolates linearly to $RECT_{1,LO}$ (i.e., extent 112a linearly interpolates to 114a) to form a first interpolant 116a, and similarly $RECT_{0,HI}$ interpolates linearly to $RECT_{1,HI}$ (extent 112b linearly interpolates to 114b) to form a second interpolant 116b.

These two interpolants provide the lower and upper bounds for the primitive trajectory 120. Accordingly, it can be guaranteed that the triangle 110 cannot enter the tile 130 sooner than:

$$t_{min} = (TILE_{LO} - RECT_{O,HI})/(RECT_{1,HI} - RECT_{O,HI}) \quad (eq.\ 2)$$

and must leave the tile 130 no later than:

$$t_{max} = (TILE_{HI} - RECT_{0,LO})/(RECT_{1,LO} - RECT_{0,LO}) \quad (eq.\ 3)$$

As exemplified by equations 2 and 3 above, a non-screen space bound for the AABB is defined as a function of a plurality of screen space points of the primitive's trajectory. In the foregoing example, each of the non-screen space bounds $t_{min}$ and $t_{max}$ for the AABB 250 are defined as a function of the primitive's trajectory points $RECT_{0,LO}$ $RECT_{0,HI}$ $RECT_{1,LO}$ $RECT_{1,HI}$, these points representing the leading and trailing edges of the primitive, respectively, at each of the two time indices t=0 and t=1.

More particularly, a non-screen space bound for the AABB 250 is defined as function of the distance (i.e., difference) between two screen space points of the primitive's trajectory 120. In the above exemplary embodiment of equations 2 and 3, the non-screen space bound $t_{min}$ is defined as a function of a distance between the trajectory's screen space points $RECT_{1,HI}$ and $RECT_{0,HI}$, and the non-screen space bound $t_{max}$ is defined as a function of distance between the trajectory's screen space points $RECT_{1,LO}$ and $RECT_{0,LO}$. In alternative embodiments, the non-screen space dimension defined for the AABB may be one of the lens dimensions (u,v), as further illustrated below.

Once the non-screen space bounds are determined, the bounding volume can be constructed. In particular, the AABB 250 is constructed having a screen space dimension (the x-dimension in FIG. 2) that extends between the tile's high and low extents/bounds $TILE_{HI}$ 134 and $TILE_{LO}$ 132, and a non-screen space dimension (t in FIG. 2) which extends between the non-screen space dimension's high and low bounds.

Although not shown, the AABB 250 will have a corresponding representation in (y,t) coordinate system. Further exemplary, the AABB 250 may be constructed in any of the coordinate systems (x,t), (y,t), (x,u), or (y,v) coordinate systems. As used herein, each of the terms "bounding volume," "axis-aligned bounding volume," or "AABB" is not restricted to a three dimensional geometry, but includes a geometry of any dimension which operates to approximate a primitive. Exemplary, a bounding volume, an axis-aligned bounding volume, or an AABB is a geometry of two or more dimensions which operate to at least partially envelope a primitive.

The AABB 250 will overlap a portion of the tile/screen space region 130 with the tile 130 having a plurality of sample points distributed thereover which may be tested for intersection by the triangle. The number of sample points ("samples" for brevity) included within the tile 130 may be any arbitrary number, ranging from 2-128, or more and may be dependent or independent of the tile's size. In a particular embodiment, the sample density per region (e.g., number of samples per pixel) is in the range of 2-32 samples per pixel, and more particularly, 4-16 samples per pixel.

Each sample is indexed in both a screen space dimension and at least one non-screen space dimension, FIG. 2 showing samples indexed in x-dimension screen space and time dimensions. The samples 260 are distributed over space (x) and time (t), i.e., different samples have different times and different locations within the tile 130, although such samples may not be tested depending upon whether the AABB 250 overlaps those samples, as described below. FIG. 2 illustrates the arrangement of the samples in tile 130, but it will be understood that horizontally adjacent tiles will also include sample points.

As illustrated, the AABB 250 overlaps some of the samples included within the tile 130 (samples 260a, darkened), while other samples are not overlapped by the bounding volume 250 (samples 260b, undarkened). Advantageously, samples 260b which are included within the tile 130 and which are not overlapped by (i.e., no included within) the AABB 250 are discarded or excluded from testing, thereby improving the sample test efficiency for the tile 130.

The skilled person will appreciate that the present technique has the property that when the motion is twice as fast, the [$t_{min}$, $t_{max}$] range for a tile becomes half as wide, and correspondingly, the size of the AABB 250 is reduced. Thus, the sample test efficiency does not decrease when the magnitude of motion increases in the present invention.

As noted, the present invention can be extended to support improve sample test efficiency in depth of field rendering as well. In this case, each frame buffer sample is further indexed with a lens position (u, v). It is therefore possible to optimize depth of field similarly to motion blur, with the exception that the resulting horizontal and vertical solutions are independent (not intersected); these bounds are referred to as u-bounds [$u_{min}$, $u_{max}$] and v-bounds [$v_{min}$, $v_{max}$] herein, and computed in place of [$t_{min}$, $t_{max}$] equations 2 and 3 above. Once these bounds are defined, a corresponding bounding volume for the particular tile can be constructed, and testing can be limited to the samples that are within the tile and the bounding volume, as further described below. Exemplary, stratified sampling in 2D is used to find the samples within the bounds, with the samples also indexed and arranged according to the lens dimensions (u,v).

Figure 3A:
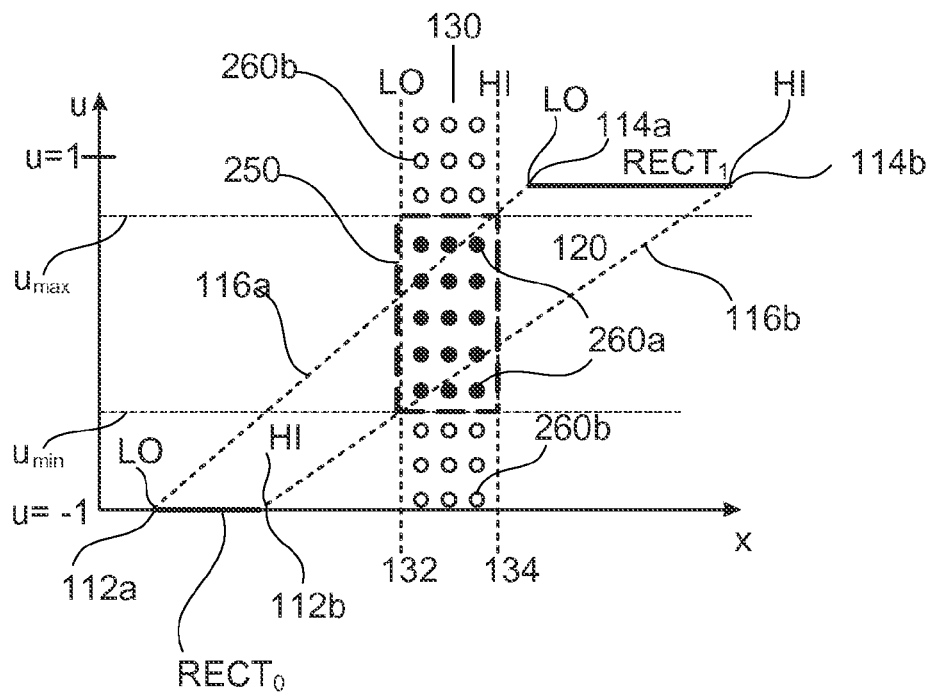
FIGS. 3A and 3B illustrate an axis-aligned bounding box as a function of lens dimension (u) and (v), respectively, in accordance with the present invention.
Figure 3B:
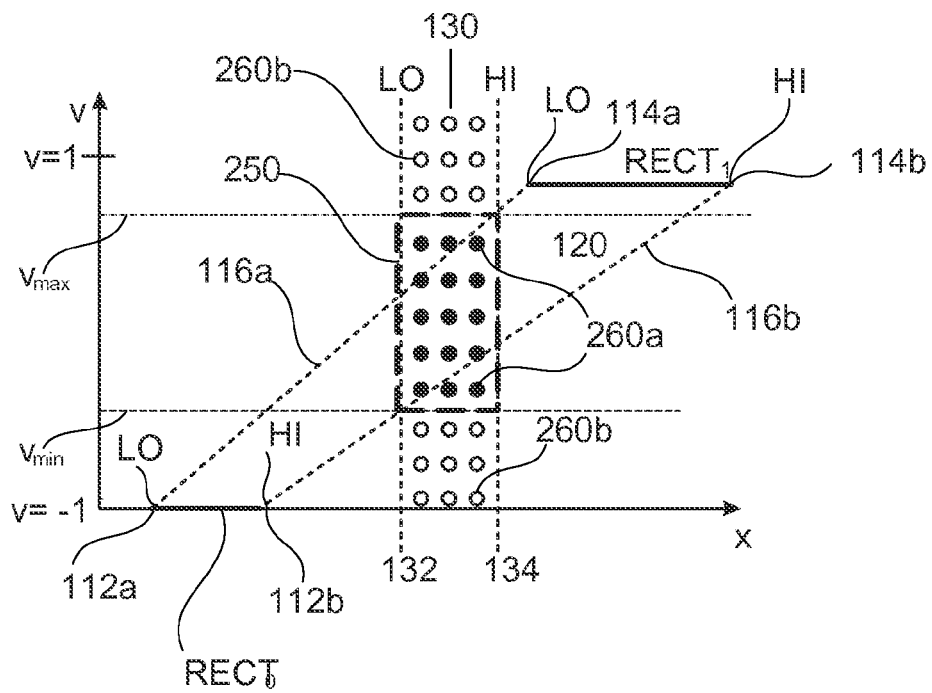

FIGS. 3A and 3B illustrate the AABB 250 as a function of the horizontal and vertical lens dimension (u) and (v), respectively, in accordance with the present invention. The screen space region (in the x-dimension in FIG. 3A and in the y-dimension in FIG. 3B) of tile 130 includes samples 260 (collectively, samples 260a and 260b) which may be tested. The samples 260 are arranged corresponding to different lens positions (u) or (v), i.e., different samples are available for testing when viewed for different lens positions (u) or (v) and at different locations within the tile 130. The samples are described as "available for testing," since one or more of the samples may not be tested, depending upon whether the AABB 250 overlaps those samples, as described below. Horizontal and vertical lens dimensions (u) and (v) extend along their respective axes between minimum and maximum values +1 to −1, as is the convention in the industry.

In FIG. 3A, the AABB is formed per tile 130 and includes screen space bounds $TILE_{LO}$ 132 and $TILE_{HI}$ 134 and the non-screen space bounds of $u_{min}$ and $u_{max}$ corresponding to the horizontal lens dimension coordinates. Similarly, the AABB of FIG. 3B is formed per tile 130, that AABB including screen space bounds $TILE_{LO}$ 132 and $TILE_{HI}$ 134 for tile 130 and the non-screen space bounds of $v_{min}$ and $v_{max}$ corresponding to the vertical lens dimension coordinates which produces apparent motion of the triangle. The computation of $u_{min}/u_{max}$ and $v_{min}/v_{max}$ is analogous to the computation of $t_{min}$ and $t_{max}$ in which above equations 2 and 3 are used to determine these respective u- and v-bounds.

As illustrated, the AABB 250 overlaps some of the samples included within the tile 130 (samples 260a, darkened), while other samples are not overlapped by the AABB 250 (samples 260b, undarkened). In this embodiment, and the primitive overlaps or extends over the region from apparent motion of the primitive. Advantageously, samples 260b which are included within the tile 130 and which are not overlapped by the AABB 250 are discarded or excluded from testing, thereby improving the sample test efficiency for the tile 130.

Figure 4:
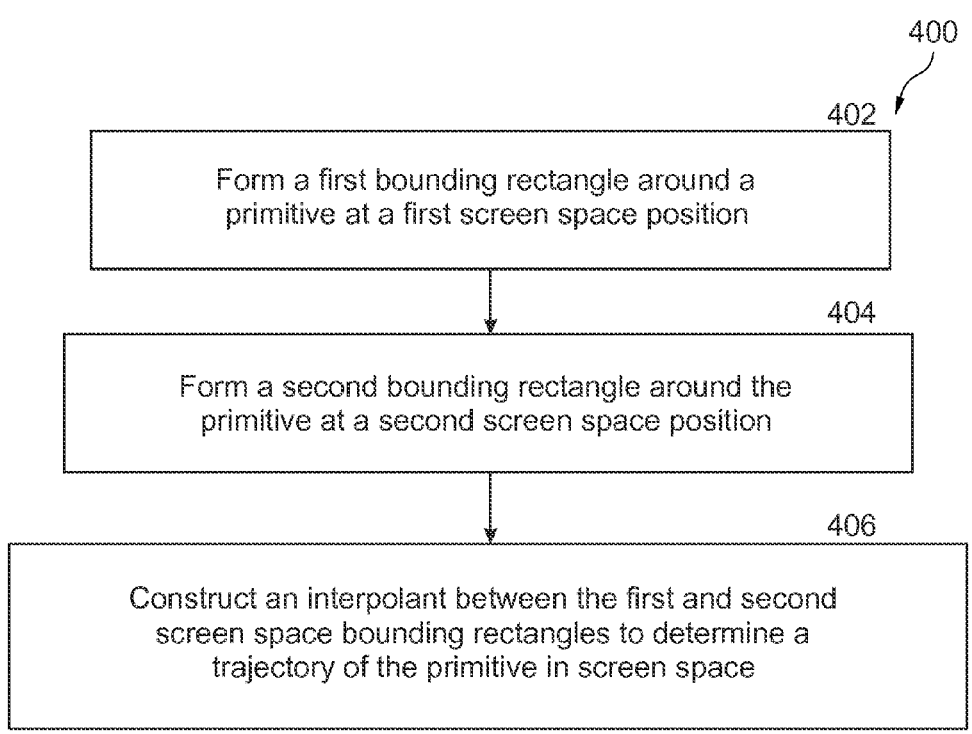
FIG. 4 illustrates a method for constructing a trajectory of a primitive approximated by rectangular bounding structures as shown in FIGS. 1A-3B in accordance with the present invention.

FIG. 4 illustrates a method 400 for constructing a trajectory of a primitive approximated by rectangular bounding structures as shown in FIGS. 1A-3B in accordance with the present invention. At 402, a first screen space bounding rectangle is formed to approximate a primitive at a first screen space position, the primitive at the first screen space position characterized by a first index in a non-screen space dimension, e.g., time or lens dimension (u,v). At 404, a second screen space bounding rectangle is formed to approximate the primitive at a second screen space position, the primitive at the second screen space position characterized by a second index in the non-screen space dimension. At 406, an interpolant is formed between the first and second screen space bounding rectangles, the interpolant having a non-screen space dimension which is a function of the first and second non-screen space indices. Further exemplary, the non-screen space dimension is characterized as a function of the difference between the first and second non-screen space indices.

Exemplary of operations 402 and 404, bounding rectangles $RECT_0$ 112 and $RECT_1$ 114 are formed to envelope/approximate triangles $110_0$ and $110_1$ at minimum and maximum positions $(x_0, y_0)$ and $(x_1, y_1)$, as shown in FIGS. 1A and 1B, each position characterized with a time index (t=0 or t=1), or a (u,v) lens dimension index (u,v=−1, u,v=+1).

Exemplary of operation 406, a bounding line is formed (e.g., linearly interpolated) between point pair $RECT_{1,LOW}$, $RECT_{0,LOW}$, and between point pair $RECT_{1,HI}$, $RECT_{0,HI}$. Further exemplary of operation 406, the bounding lines are formed as a function of the difference between the first and second indices of the non-screen space dimension, e.g., the bounding lines are formed as a function of $$\frac{d(t)}{d(x)}$$

in the (t,x) space shown in FIG. 2, as a function of $$\frac{d(u)}{d(x)}$$

in the (u,x) space shown in FIG. 3A, and as a function of $$\frac{d(v)}{d(y)}$$

in the (v,y) space shown in FIG. 3B.

Further exemplary of operation 406, the interpolant is a linear interpolant, e.g., a bounding line is linearly interpolated between point pair $RECT_{1,LOW}$, $RECT_{0,LOW}$, and between point pair $RECT_{1,HI}$, $RECT_{0,HI}$. In another embodiment, the interpolant is a non-linear interpolant, e.g., a curvilinear interpolant. Further particularly to this latter embodiment, the non-linear interpolant is a rational interpolant. As shown in FIGS. 2, 3A and 3B, the AABB can be formed in each of the non-screen space dimensions of time (t), and lens dimensions (u) and (v).

Once the primitive's trajectory is determined, the non-screen space bounds of the AABB are determined, exemplary in accordance with equations 2 and 3 above. The AABB is constructed per a particular screen space region, e.g., tile 130. In the illustrated embodiment, t-bounds $[t_{min}, t_{max}]$ are determined, per equations 2 and 3 and a AABB is constructed having a screen space dimension which extends between the predefined bounds of the tile $TILE_{LO}$ and $TILE_{HI}$, and a non-screen space dimension which extends between the t-bounds $[t_{min}, t_{max}]$.

An exemplary peusdocode implementation of the affine (t,x) case is as follows:

```
Vec2f getSpan(float lo,float hi, // the (lo,hi)
    float p0, float p1,float p2, // vertex position
    float mv0,float mv1,float mv2) // motion vectors
{
    // PER PRIMITIVE COMPUTATION
    //—initial bbox extents, and motion of the extents
    float primLo=min(p0,p1,p2);
    float primHi=max(p0,p1,p2);
    float primLo2=min(p0+mv0,p1+mv1,p2+mv2);
    float primHi2=max(p0+mv0,p1+mv1,p2+mv2);
    float mvLo=primLo2−primLo;
    float mvHi=primHi2−primHi;
    // PER PIXEL/TILE
    //—note that all conditionals are const predicates
    float ta=(lo−primHi)/mvHi;  // 2×FMA (could be, not shown)
    float tb=(hi−primLo)/mvLo;
    float t0=(mvHi>=0.f)?ta: −FW_F32_MAX;  // 2×SEL
    float t1=(mvHi>=0.f)?FW_F32_MAX: ta;
    if(mvLo>=0.f) t1=min(t1,tb);  // 2×FMNMX
    else t0=max(t0,tb);
    return Vec2f(t0,t1);
}
```

Primitive Approximation using Bounding Triangles

The foregoing operations are applicable to stochastic rasterization, whereby time spans (or lens regions) are computed over which a screen-space bounding rectangle may overlap a screen-space tile. While effective for culling work in stochastic rasterization, a rasterizer based on a rectangle-rectangle overlap test may not be sufficient. The following methods represent a modified approach, in which time-varying edge functions are used to approximate the primitive in screen space, permitting efficient coarse (conservative) rasterization of moving primitives.

In coarse rasterization, the task is to determine whether any point of a tile is covered by a triangle, or equivalently, whether a tile is at least partially on the positive side of all three edges, assuming edge functions are defined to be positive inside the triangle. Keeping with the foregoing illustrated embodiments in which the non-screen space dimension is time, the goal of a corresponding coarse rasterization algorithm would be to determine a relatively tight time span $[t_{min}, t_{max}]$ during which a primitive, e.g., a triangle, may overlap a screen-space tile. These bounds can be used for two purposes: (i) if the intersection of $[t_{min}, t_{max}]$ and exposure time [0,1] is empty, it is known that the tile is not covered during the exposure time and all samples included therein can be excluded; and (ii) if the intersection is non-empty, the individual samples whose t-values are outside [$t_{min}$,$t_{max}$] can be excluded.

Figure 5A:
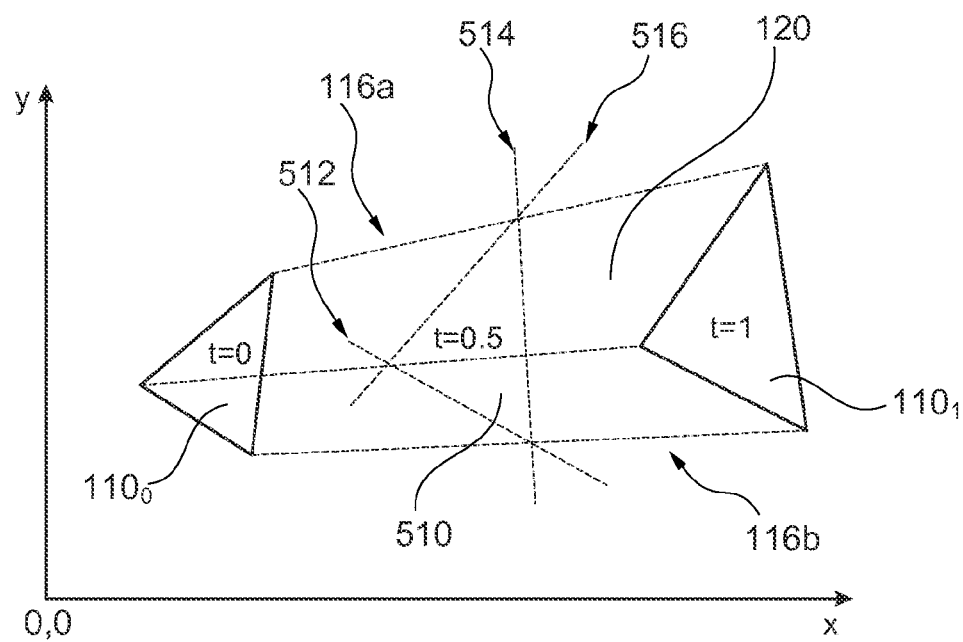
FIGS. 5A-5C illustrates an exemplary process for approximating a primitive using bounding triangles in accordance with the present invention.
Figure 5B:
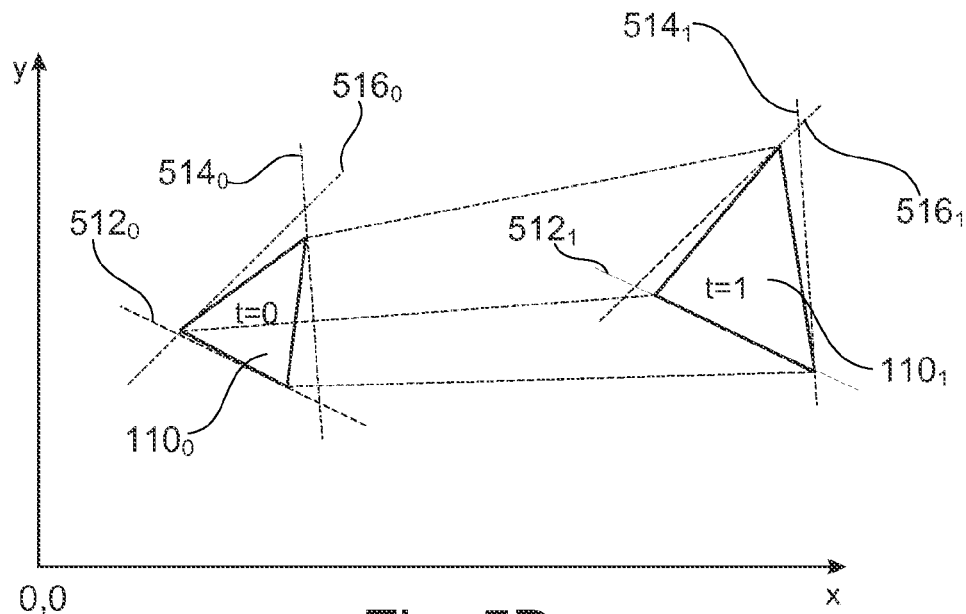
Figure 5C:
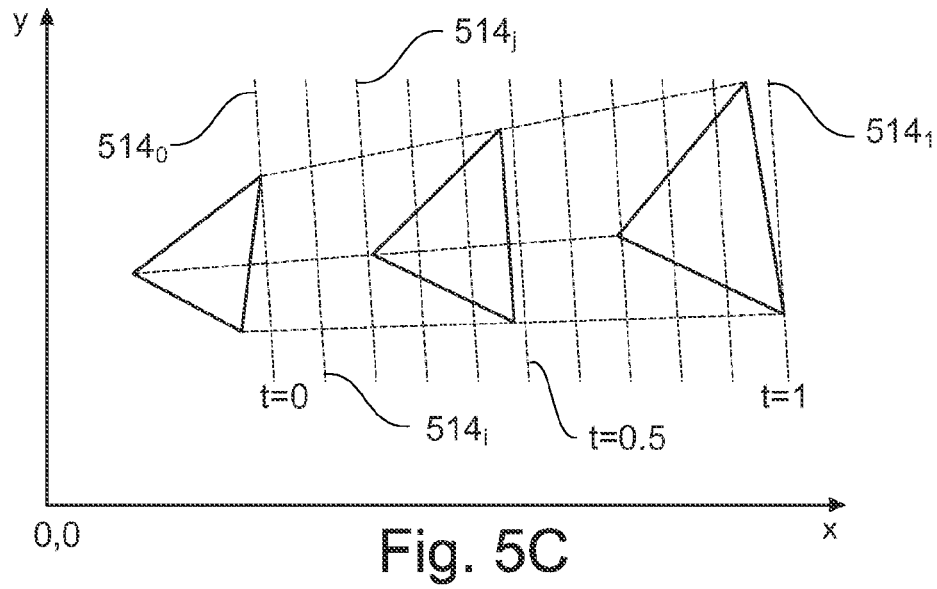

FIGS. 5A-5C illustrates an exemplary process for approximating a primitive using bounding triangles in accordance with the present invention, with previously described features retaining their reference indices. Referring to FIG. 5A, the triangle 110 is shown at t=0 (virtual camera shutter opens) and t=1 (closes). Each of the triangle's vertices are interpolated to t=0.5, and bounding lines (or edges) 512, 514, and 516 for this time index are constructed, these bounding lines 512, 514 and 516 collectively approximating the screen space position of the triangle 110 at time index t=0.5. On the left is a triangle $110_0$ at start of frame (t=0), on the right at end of frame (t=1, triangle $110_1$), and in the middle between those instants (t=0.5, triangle 410) along the screen space trajectory 120. Each of the bounding lines 512, 514 and 516 are described by line equations in the form Ax+By +C, in which coefficients A and B are determined at t=0.5. The upper and lower bounding lines/interpolants 116a and 116b for the primitive's trajectory 120 are shown.

Referring to FIG. 5B, the triangles $110_0$ and $110_1$ at t=0 and t=1 are bounded as tightly as possible using bounding lines of the form Ax+By+C. This provides two positions for each of the bounding lines 512, 514 and 516, one for t=0 and one for t=1. In particular, coefficients C of edge equations (Ax+By+C) are determined for each time indices t=0 and t=1, resulting in bounding lines $512_0$, $514_0$ and $516_0$ for time index t=0, and bounding lines $512_1$, $514_1$ and $516_1$ for time index t=1. Collectively, the bounding lines are determined so that they form a structure which contains (i.e., envelopes) the triangle at each of the t=0 and t=1 indices.

Exemplary, the orientation (i.e., the slope) of the bounding lines 512, 514 and 516 for the triangle remain the same during the entire frame. The coefficients are denoted as A, B, C0, and C1, where C0 corresponds to C at t=0 and C1 corresponds to C at t=1. Further exemplary, the equalities C=C0 and Ct=C1−C0 can be defined, so that only Ct depends linearly on t. As such, each of the line equations 512, 514 and 516 can be written as:

$$Ax+By+C+Ct*t, \quad (eq.\ 4)$$

where the quantity (Ct*t) describes the translation during exposure.

Thus, the three line equations 512, 514 and 516 can be translated to $512_0$, $514_0$ and $516_0$ to approximate the triangle at the t=0 time index, and likewise to $512_1$, $514_1$, and $516_1$ to approximate the triangle at the t=1 time index. As can be seen, each of the line equations changes only its offset with regard to time, and not its orientation or slope.

Because of this property, the line functions are referred to herein as "translation-only time-continuous" (TOTC) edges/lines. As the foregoing expression is a first degree polynomial, the time when an line crosses an arbitrary point (x,y) can be determined as:

$$t=-(A*x+B*y+C)/Ct \quad (eq.\ 5)$$

the quantity t representing the non-screen space interpolant 520 shown in FIG. 5C.

Accordingly, the aforementioned t-bounds [$t_{min}$, $t_{max}$] can be computed given the coefficients of the TOTC bounding lines, and a bounding volume (e.g., an AABB) constructed to describe the non-screen space region overlapped by the primitive in a given tile, such as shown in FIG. 2.

Referring to FIG. 5C, a plurality of different versions of bounding line $514_0$, $514_i$, $514_j$ . . . $514_1$ are shown, each version representing a shifted version of 514 according to time t per the above eq. (5) above. In particular, if affine motion is assumed, the coefficient C of the bounding line equations is linearly interpolated between C0 and C1 according to time t, and the corresponding bounding lines 512, 514 and 516 are guaranteed to contain the triangle at that time.

Exemplary, the coarse rasterization process is performed so that the "most positive" corner of a tile is selected for each line, and further exemplary, is the same corner for each tile and can thus be identified during setup. Furthermore, the lines can be offset (also during setup) so that during rasterization it is sufficient to evaluate all lines at the same pre-determined point, e.g. lower-left corner of a tile.

Figure 5D:
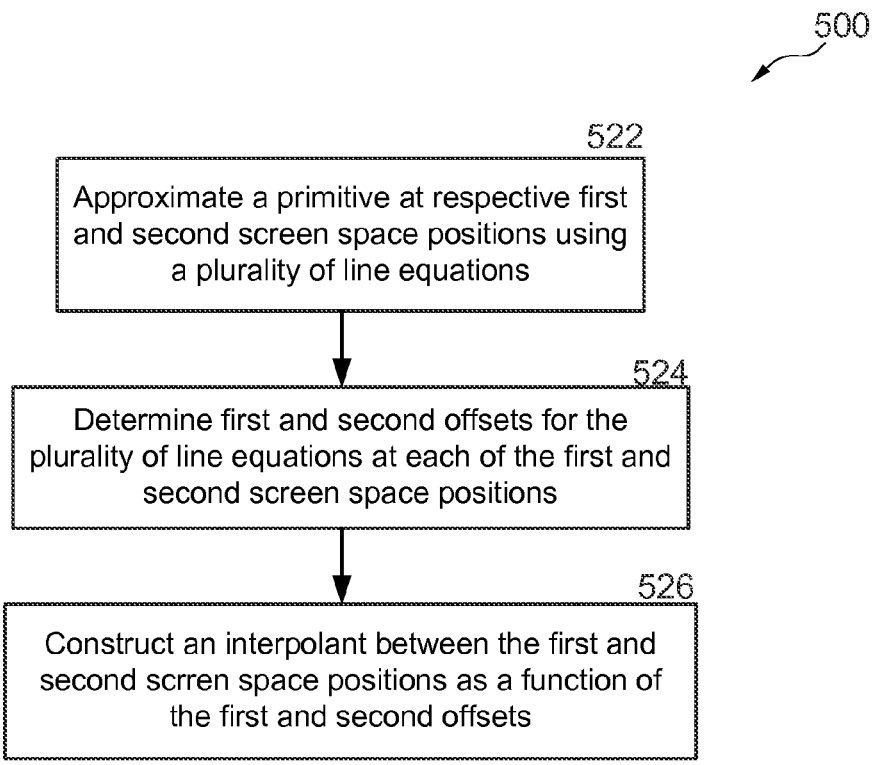
FIG. 5D illustrates a method for constructing a trajectory of the primitive shown in FIGS. 5A-5C in accordance with the present invention.

FIG. 5D illustrates a method 500 for constructing a trajectory of the primitive shown in FIGS. 5A-5C in accordance with the present invention. At 522, a primitive at respective first and second screen space positions are approximated using a plurality of line equations (e.g., Ax+By+C). At 524, respective first and second line equation offsets (e.g., C0 and C1) are determined for line equations (e.g., 512, 514 and 516) at the respective first and second positions, the line equations operable to approximate the primitive at the respective first and second positions (e.g., triangles $110_0$ and $110_1$). At 526, an interpolant (e.g., 520) is constructed between the first and second screen space positions as a function of the first and second offsets (e.g., as a function of the difference between C1-C0).

Exemplary of operation 522, each line equation is in the form of Ax+By+C. In a specific embodiment, the offset of each line equation is a function (linear or non-linear) of the non-screen space dimension (e.g., time in the illustrated embodiment of FIG. 5C). Further exemplary, three lines are generated and intersected to form a convex bounding polygon for approximating the primitive. Additionally, the bounding polygon includes at least one axis-aligned line, and in a particular embodiment includes at least two parallel lines (shown as time indices $514_i$ and $514_j$ in FIG. 5C).

Exemplary of operation 526, an interpolant between the first and second screen space positions is constructed as a function of the first and second offsets, either as a linear function (e.g., for affine motion approximation) or a non-linear/curvilinear function (e.g., using a perspective correct motion approximation). Further particularly, the interpolant is defined according to equation 5, and two or more of such interpolants are used as bounding lines for an AABB.

Once the primitive's trajectory is constructed, the non-screen space bounds of the AABB are determined, exemplary in accordance with equations 2 and 3 above. The AABB is constructed per a particular screen space region, e.g., tile 130. In the illustrated embodiment, t-bounds [$t_{min}$,$t_{max}$] are determined, per equations 2 and 3 and a AABB is constructed having a screen space dimension which extends between the predefined bounds of the tile $TILE_{LO}$ and $TILE_{HI}$, and a non-screen space dimension which extends between the t-bounds [$t_{min}$,$t_{max}$].

Computation of the TOTC line/edge functions of the present invention are much faster and less expensive than conventional time-continuous lines/edges, as the latter have a quadratic dependence on t and the orientation changes during exposure and thus an edge may actually visit a tile more than once. As such, a coarse raster optimization technique employing conventional time-continuous edges would be difficult and expensive to implement in comparison to the TOTC lines of the present invention.

An exemplary pseudocode embodiment of edge function computations having a translational dependence on time is as follows:

```
struct TranslationEdgeFunction
{
    TranslationEdgeFunction(const     Vec2f&     v0t0,const
      Vec2f& v1t0, // vertex positions const Vec2f& mv0,
      const Vec2f& mv1) // motion vectors
    // average position (t=0.5)
    const Vec2f v0=v0t0+0.5f*mv0;
    const Vec2f v1=v1t0+0.5f*mv1;
    // orientation (A,B) of average edge
```

```
// NOTE: positive values inside triangle→
// edge normal (A,B) points inside triangle
A=v0.y-v1.y;
B=v1.x-v0.x;
// bounds for C at t=0 and t=1
// select smaller to guarantee tri fully included.
// C=-Ax-By;
    const Vec2f v0t1=v0t0+mv0;
    const Vec2f v1t1=v1t0+mv1;
    const float C0=-min(A*v0t0.x+B*v0t0.y, A*v1t0.x+
        B*v1t0.y);
    const float C1=-min(A*v0t1.x+B*v0t1.y, A*v1t1.x+
        B*v1t1.y);
    // construct edge function
    C=C0;
    Ct=C1-C0; // changes from C0 to C1 when t goes from
        0 to 1
}
void offsetEdge(float dx,float dy)
{
    if(A>=0) C+=dx*A;
    if(B>=0) C+=dy*B;
}
Vec2f getSpan(float x0,float y0) const
{
    // Solve time t so that: Ax+By+C+Ct*t>=0
    // Ct*t>=-Ax-By-C
    // t>=(-Ax-By-C)/Ct
    // the time edge crosses the minimum corner
    float t=-(A*x0+B*y0+C)/Ct; // 2×FMA+FMUL
    if(Ct<0) return Vec2f(-FW_F32_MAX,t); // 2×SEL
    else return Vec2f(t,FW_F32_MAX);
}
float A;
float B;
float C;
float Ct; // time-varying
};
```

An exemplary pseudocode implementation of per-triangle operations is as follows:

```
TranslationEdgeFunction ef0,ef1,ef2;
bool useEdges;
void setup(float dx,float dy, // screen-space the size
    const Vec4f& v40,const Vec4f& v41,const Vec4f& v42, //
        vertex positions
    Vec4f mv4[3]) // motion vectors
{
    Vec2f v0=v40.getXY( );
    Vec2f v1=v41.getXY( );
    Vec2f v2=v42.getXY( );
    Vec2f mv0=mv4[0].getXY( );
    Vec2f mv1=mv4[1].getXY( );
    Vec2f mv2=mv4[2].getXY( );
    // Construct edge functions (A,B,C,Ct)
    ef0=TranslationEdgeFunction(v1,v2, mv1,mv2);
    ef1=TranslationEdgeFunction(v2,v0, mv2,mv0);
    ef2=TranslationEdgeFunction(v0,v1, mv0,mv1);
    // Offset edges so that we can always test with (x0,y0)
    ef0.offsetEdge(dx,dy);
    ef1.offsetEdge(dx,dy);
    ef2.offsetEdge(dx,dy);
}
```

Pseudocode implementation of per-tile operations:

```
Vec2f perTile(float dx,float dy, // screen-space the size
    const Vec4f& v40,const Vec4f& v41,const Vec4f& v42, //
        vertex positions
    Vec4f mv4[3]) // motion vectors
{
    // get bbox t-span
    Vec2f bbspan=getBBOXSpan( . . . ); // (from another ISF)
    if(!useEdges)
        return bbspan;
    // Get tspans corresponding to edges.
    Vec2f espan0=ef0.getSpan(x0,y0);
    Vec2f espan1=ef1.getSpan(x0,y0);
    Vec2f espan2=ef2.getSpan(x0,y0);
    //
    const int MIN=0;
    const int MAX=1;
    Vec2f    espan(max(espan0[MIN],espan1[MIN],espan2
        [MIN]),
        min(espan0[MAX],espan1[MAX],espan2[MAX]));
    // intersect with bbox t-span
    return Vec2f(max(espan[MIN],bbspan[MIN]), min(espan
        [MAX],bbspan[MAX]));
}
```

Figure 6A:
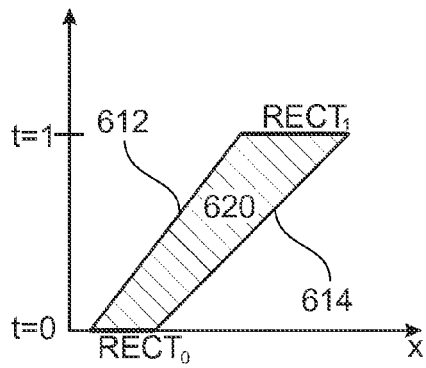
FIGS. 6A and 6B illustrates primitive trajectories corresponding to affine and perspective correction motion approximations, respectively, in accordance the present invention.
Figure 6B:
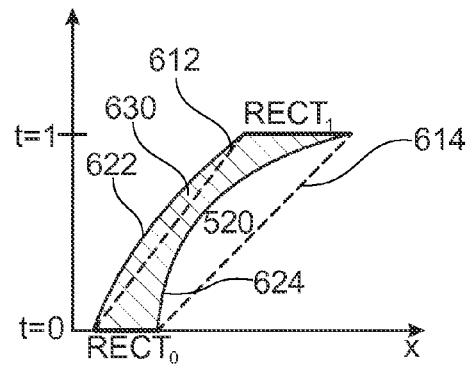

Primitive Trajectory and Bounding Box Construction for Perspective Correct Approximation FIGS. 6A and 6B illustrates axis-aligned bounding boxes corresponding to affine and perspective correction motion approximations, respectively, in accordance the present invention. FIG. 6A illustrates an AABB for an affine motion approximation, where vertices of an exemplary triangle undergo linear motion in projected screen coordinates, i.e., they trace out linear paths 612 and 614 in the three-dimensional XYT screen-time volume. The bounding volume (hatched) swept out by the primitive is bounded by planes. FIG. 6B illustrates an AABB for a perspective correction motion approximation, where the vertices' motion is taken to be linear in world coordinates instead, perspective causes the motion to curve in (x,y,t) space, resulting in curved paths 622 and 624 bounding a volume 626 swept out by the primitive 110. This may cause the temporal bounding box 620 bounded by linear interpolation of the screen space bounding structure to not contain the hatched volume 630 swept out by the primitive.

Figure 7A:
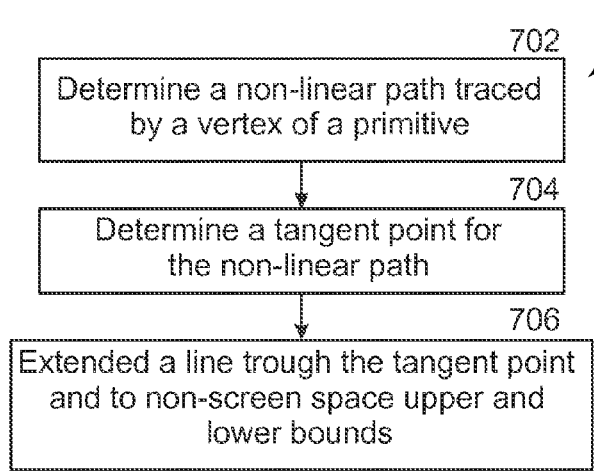
FIG. 7A illustrates a first exemplary method for constructing the trajectory of a primitive having perspective correct motion in accordance with the present invention.

FIG. 7A illustrates a first exemplary method 700 for constructing the trajectory of a primitive having perspective correct motion in accordance with the present invention. In this embodiment, the method builds upon the affine solution, but expands the t=0 and t=1 bounds sufficiently to capture the additional volume over which the primitive may travel. At 702, a non-linear path is determined for a vertex of a primitive (exemplary, a rational expression as a function of time), the non-linear path being defined in accordance with a predefined perspective correct motion approximation of the vertex. Exemplary, the perspective correction motion approximation is as known in the art, e.g., according to the equation:

$$x(t)=(X0+t*MVx)/(W0+t*MVw) \qquad \text{eq. (6)}$$

for the screen coordinate x, where X0,W0 are the X and W coordinates of the vertex at t=0, and MVx and MVw are the motion vectors along the clip space X and W dimensions. Screen coordinates y are computed analogously.

At 704, a tangent point for the non-linear path is selected. Exemplary the mid-point along the non-screen space dimension is selected as the tangent point for the non-linear path.

At 706, a line is extended to intersect the tangent point, and to extend to each of predefined non-screen space upper and lower bounds exemplary, (0,1) for time. The extended line functions as an interpolant of the primitive's trajectory. A bounding volume for the screen space region can then be constructed based upon the points where the extended line intersects the upper and lower non-screen space bounds. Processes 702-706 can be performed for one or more additional vertices of the primitive, or more specifically for each of a leading edge vertex and a trailing edge vertex in order to ascertain upper and lower bounding lines.

Figure 7B:
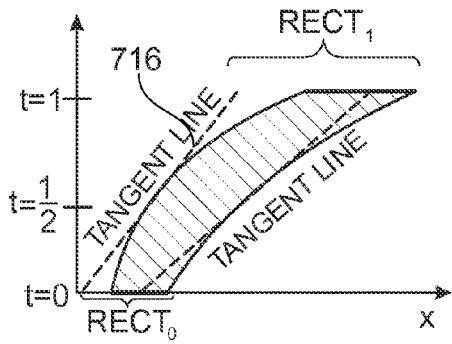
FIG. 7B illustrates the construction of a primitive's trajectory in accordance with the method of FIG. 7A and the present invention.
Figure 7C:
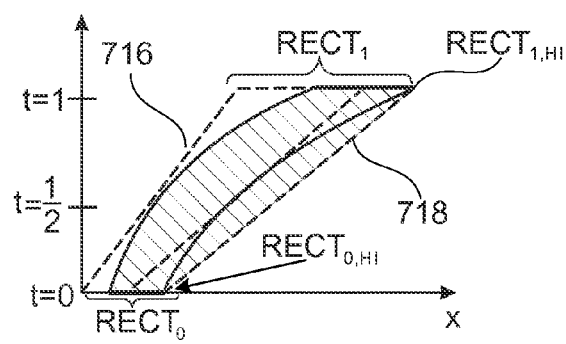
FIG. 7C illustrates the construction of a bounding volume using the primitive's trajectory shown in FIG. 7B in accordance with the invention.

FIG. 7B illustrates the construction of a primitive's trajectory in accordance with the method of FIG. 7A. As shown in FIG. 7B, the non-linear paths traced out by the vertices are convex functions, thus their tangent lines bound them. Tangent lines of all vertex paths are computed at t=0.5, and these lines are extended to intersected with the t=0 and t=1 lines. This results in new points that may lie outside the t=0 and t=1 bounding structures of the primitive. FIG. 7C illustrates the construction of a bounding volume using the primtive's trajectory shown in FIG. 7B. The bounding volume implements the interpolant 716, which represents the extended (tangent) line, and interpolant 718, which is a linear interpolation between the upper and lower t-bounds at points $RECT_{0,HI}$ and $RECT_{1,HI}$. As shown, the primitive bounding structure is extended using the newly-computed points, and the minimums and maximums are interpolated in the same way as in the affine case. Due to convexity, this guarantees that the primitive is contained within the bounding volume.

Figure 8A:
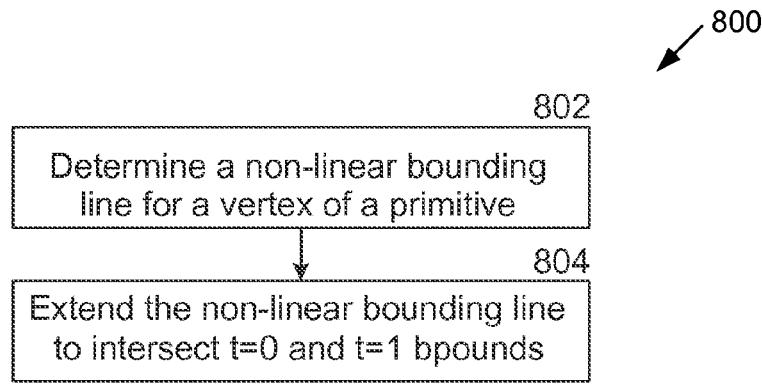
FIG. 8A illustrates a second exemplary method for constructing the trajectory of a primitive having perspective correct motion in accordance with the present invention.

FIG. 8A illustrates a second exemplary method 800 for constructing the trajectory of a primitive having perspective correct motion in accordance with the present invention. At 802, a non-linear bounding line is determined for a vertex of a primitive (exemplary, a rational expression as a function of time), the non-linear bounding line being defined in accordance with a predefined perspective correct motion approximation of the vertex, exemplary per equation (6) above. At 804, the non-linear bounding line is extended to intersect predefined upper and lower t-bounds [0,1]. The extended non-linear line functions as an interpolant of the primitive's trajectory. Processes 802 and 804 can be performed for one or more additional vertices of the primitive, or more specifically for each of a leading edge vertex and a trailing edge vertex in order to ascertain upper and lower bounding lines. A bounding volume for the screen space region can then be constructed based upon the points where the extended curvilinear lines intersect the upper and lower non-screen space bounds.

Figure 8B:
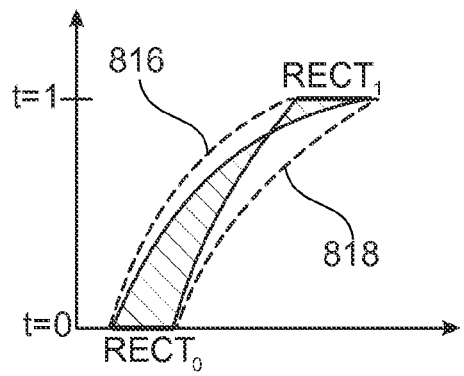
FIG. 8B illustrates the construction of a primitive's trajectory in accordance with the method of FIG. 8A and the present invention.

FIG. 8B illustrates the construction of a primitive's trajectory in accordance with the method of FIG. 8A. As shown in FIG. 8B, the bounding lines/interpolants 816 and 818 of the trajectory are constructed as rational linear expressions over time (dashed lines), similar to the motion of the vertices. Once a suitable bounding line is found during setup, intersecting the resulting curvilinear volume with the per-tile/pixel bounds proceeds as in the linear case. It is noted that although the x coordinates of the primitive cross during the frame, this does not necessarily mean that the 2D primitive would change orientation on the screen.

While the methods of FIGS. 7A and 8A are equally applicable to any non-screen space dimension, the depth-of-field does not change the depth values of vertices, and thus an affine solution is sufficient for it.

Bounding Box Construction Using Multiple Non-Screen Space Dimensions

The above-described techniques provide ways to improve sample test efficiency when rendering motion blur or depth of field/defocusing effects individually. In another embodiment of the invention, a combination of these techniques is used to improve the STE for an image that includes both of these types of effects.

Figure 9:
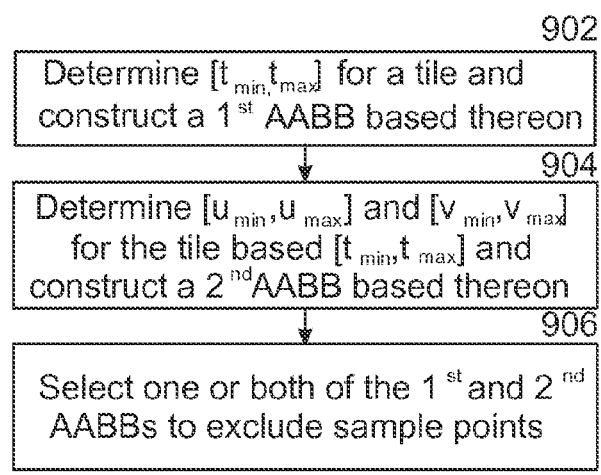
FIG. 9 illustrates an exemplary method for constructing an axis-aligned bounding box that enables improved sample test efficient when rendering concurrent motion blur and depth of field effects in accordance with the present invention.

FIG. 9 illustrates an exemplary method 900 for constructing an axis-aligned bounding box that enables improved sample test efficient when rendering concurrent motion blur and depth of field effects. At 902, t-bounds $[t_{min},t_{max}]$ for a screen space region are determined and a first AABB is determined based thereon. In one embodiment of this operation, the primitive is approximated in screen space using bounding rectangles, and the t-bounds of the primitive's AABB are determined in accordance with eqs. (2) and (3) and FIG. 2 above, wherein the t-bounds are expanded by a circle of confusion corresponding to the variation in the $t_{min}$ and $t_{max}$ indices. In another embodiment of this operation, the primitive is approximated in screen space using bounding triangles, and the t-bounds of the primitives AABB are determined in accordance with eqs. (4) and (5) and FIGS. 5A-5D above, wherein the t-bounds are expanded by a circle of confusion corresponding to the variation in the $t_{min}$ and $t_{max}$ indices.

At 904, u-bounds $[u_{min},u_{max}]$ and v-bounds $[v_{min},v_{max}]$ for the screen space region are determined based on the $[t_{min},t_{max}]$ bounds computed at 902, and a second AABB is determined based thereon, as described in FIG. 3A. The vertices' screen positions are expanded using the motion vectors based on the $[t_{min},t_{max}]$ range computed in 902 to ensure correctness. At 906, samples are excluded from testing using either the first or second AABB, or both. In one embodiment of this operation, the choice is based on which of the two AABBs (or a combination of both AABBs) discards more samples. Further exemplary, the samples in each pixel are stored in two orders: in order of increasing t strata, and in increasing uv strata in order to facilitate sample selection.

Systems and Methods for Improving STE for Image Rendering

Figure 10:
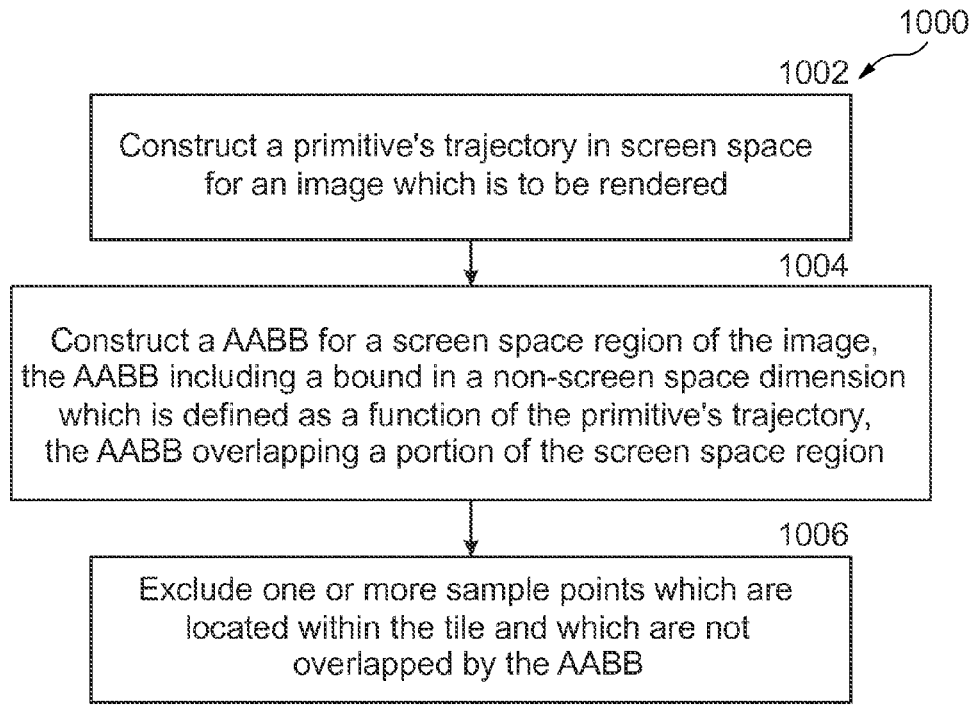
FIG. 10 illustrates an exemplary method for reducing the number of samples tested for rendering a region of an image in accordance with the present invention.

FIG. 10 illustrates an exemplary method 1000 for reducing the number of samples tested for rendering a region of an image in accordance with the present invention. At 1002, a trajectory (e.g., 120, 170) is constructed for a primitive (e.g., 110, 160) in screen space region (e.g., 130) of the image which is to be rendered. Exemplary, the trajectory includes multiple points in screen space, for example, $RECT_{0,LO}$ $RECT_{0,HI}$ $RECT_{1,LO}$ $RECT_{1,HI}$ as shown in FIG. 2.

At 1004, an axis-aligned bounding volume (e.g., AABB 250) is constructed which overlaps a portion of a screen space region which is to be rendered. The bounding volume is characterized as having at least one non-screen space bound (e.g., $t_{min}$, $t_{max}$, $u_{min}$, $u_{max}$, $v_{min}$, $v_{max}$) which is computed as a function of the screen space trajectory of the primitive. At 1006, one or more sample points (e.g., 260b) which are located within the screen space region, and which are not overlapped by the bounding volume are excluded from testing.

As exemplified from the description of FIGS. 2, 3A, and 3B, the non-screen space dimension of the AABB may be selected from time (t), the horizontal lens dimension (u), and the vertical lens dimension (v). In the embodiments described for FIG. 2, the AABB may include the time dimension (t) in combination with either the horizontal or vertical screen space dimensions (x) or (y) to form a AABB in (t,x) or (t,y) coordinate systems, respectively. In additional embodiments described for FIGS. 3A and 3B, the AABB may include the horizontal lens dimension (u) in combination with horizontal screen space dimension (x), or in terms of the vertical lens dimension (v) in combination with the vertical screen space dimension (y), thereby forming a AABB in the (u,x) or (v,y) coordinate systems, respectively.

As exemplified from the description of FIGS. 1A-1B, 3A-B, 5A-C, 6A-B, 7A-B and 8B, operation 1002 may be performed by determining first and second screen space positions of the primitive at respective first and second non-screen space indices, and constructing an interpolant extending therebetween. Further exemplary, each of the first and second screen space positions represents either a trailing edge (e.g., 112a) or a leading edge (112b) of the primitive. The interpolant may be linear or it may be non-linear, e.g., curvilinear in order to approximate perspective correct motion of the primitive, as described herein.

Further exemplary of operation 1002, the primitive is approximated in screen space by a bounding structure, exemplary embodiments of which include a convex bounding polygon, such as a bounding rectangle (examples of which are shown in FIGS. 1A and 1B), a bounding triangle (examples as shown in FIGS. 5A-5C,) or any other type of polygon. Further exemplary of operation 1002, operation 522 is performed, whereby a plurality of lines in the form of Ax+By+C are used to approximate the primitive at each of first and second screen space positions.

The AABB includes a non-screen space dimension (t), (u), or (v) and a screen space dimension (x) or (y), the latter having predefined bounds (shown as $TILE_{LO}$ and $TILE_{HI}$ in FIG. 2). Exemplary of operation 1004, the AABB is constructed by determining minimum and maximums bound in the non-screen space dimension as a function of the trajectory's screen space points, and forming an AABB which extends between those minimum and maximum bounds in the non-screen space dimension and between the predefined bounds of the screen space dimension. In a specific embodiment, the non-screen space bounds of the AABB are computed according to equations 2 and 3, above.

Exemplary of operation 1006, a determination is made as to which samples within the screen space region (e.g., the 130) are overlapped with the AABB, and excluding those sample not overlapped from testing. In a particular embodiment of this operation, the samples are arranged within the tile with increasing time, or lens dimensions (u,v), thus defining an area with increasing screen and non-screen space dimensions. The AABB also describes an area with an increasing screen and non-screen space dimensions for the trajectory of the primitive. The overlap of these two areas represents the samples which are possibly traversed by the triangle. Samples outside of this overlapped area are excluded from testing.

Exemplary, the method 1000 is carried out for each of a plurality of primitives in order to improve the sample test efficiency for determining the color/transparency/reflectance of a tile (e.g., a pixel) which is overlapped by the plurality of primitives. Further exemplary, multiple primitives overlapping a particular region/pixel may be processed in parallel, whereby multiple instances of operations 1002 and 1004 (one instance for each primitive) are carried out concurrently.

The construction of an AABB performed in operation 1004 may be carried out according to each of the methods described for FIGS. 4, 5D, 7A, 8A and 9. For example, a bounding rectangle may be used to approximate the triangle at each of the two (e.g., minimum and maximum) positions, an interpolant is formed between the first and second bounding rectangles, and an AABB is constructed based upon the interpolant, as described for FIG. 4.

In another embodiment of operation 1004 exemplified in FIG. 5D, a bounding triangle is used to approximate the triangle at two screen space positions. In such an embodiment, a primitive is approximated at respective first and second screen space positions using a plurality of line equations. Respective first and second line equation offsets (e.g., C0 and C1) are determined for line equations (e.g., 512, 514 and 516) at the respective first and second positions. An interpolant (e.g., 520) is determined as a function of the first and second offsets (e.g., the difference between C1-C0), and an AABB is constructed based upon the interpolant (e.g., the interpolant is employed as bounding lines/side to construct the AABB).

In another embodiment of operation 1004 exemplified in FIG. 7A, curved paths traced out by the vertices for the perspective correct motion approximation are determined. Each tangent line is then extended to intersect the non-screen space upper and lower bounds, and the AABB is constructed using these new points as described above, resulting in an expanded axis-aligned bounding box.

In a further embodiment of operation 1004 exemplified in FIG. 8A, curvilinear bounding lines for the AABB are determined, the curvilinear bounding lines tracing/approximating the motion of the primitive's vertices over time. Each curvilinear bounding line is extended to intersect the upper and lower t-bounds $[t_{min}, t_{max}]$, and an AABB is constructed using the intersection points.

In a further embodiment of operation 1004 exemplified in FIG. 9, the t-bounds $[t_{min}, t_{max}]$ of a tile are determined an a corresponding AABB is determined based thereon. Based upon the $[t_{min}, t_{max}]$ bounds, u- and v-bounds $[u_{min}, u_{max}]$ or $[v_{min}, v_{max}]$ are determined for the tile and a second AABB is determined based upon the u- or v-bounds. Either or both of the first and second AABBs are then used to exclude sample points. Exemplary, the choice as to whether the first, second or a combination of both AABBS is selected is based on which of the two discards more samples. Further exemplary, the samples in each pixel are stored in two orders: in order of increasing t strata, and in increasing uv strata in order to facilitate sample selection.

In an exemplary application, the method of FIG. 10 is carried out as a part of a graphics pipeline process, e.g, as a part of a pixel shader program executed to compute the color/transmittance/reflectance of the screen space region, e.g., a fragment or a pixel. Execution time of the shader program is shortened due to the smaller number of samples tested, and as such, the shader is able to compute the pixel's color faster without loss of accuracy.

Figure 11:
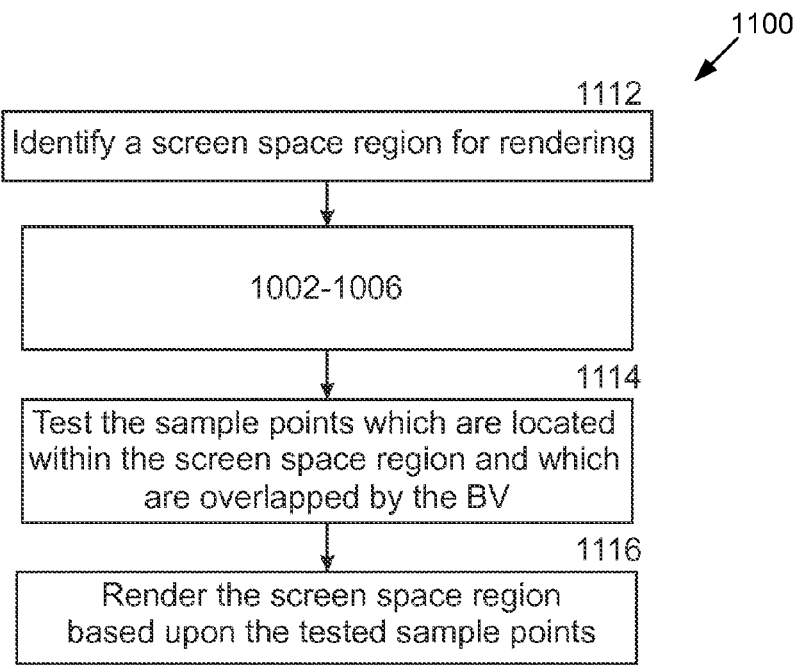
FIG. 11 illustrates an exemplary method for rendering a region of an image in accordance with the present invention.

FIG. 11 illustrates a method for rendering a region of an image which incorporates method 1000. At 1112, a screen space region which is to be rendered is identified. This process may be performed automatically during image rendering, as successive regions (e.g., pixels) of an image which is to be rendered are selected one after another, or it may occur manually, for example, if the viewer manually selects a region which is to be viewed. The method 1100 continues with the implementation of operations 1102, 1104 and 1106 as described, and implemented in accordance with one or more of the exemplary embodiments described herein. At 1114, the samples which are located within the screen space region, and which are overlapped by the bounding volume of the primitive are tested. At 1116, the screen space region of the image is rendered based upon the tested samples. Exemplary embodiments of operation 1116 include implementing a shader program operable to compute the color/transmittance/reflectance of the screen space region based upon the tested samples within that region and overlapped by the bounding volume. Further exemplary, the method 1100 is repeated one or more times to render multiple regions of the image or the entire image. As used herein, the term "render" refers to the output of the screen space region/image in a visually comprehensible format (e.g., displayed on a monitor, printed on a medium, etc.), as well as the process of storing the data corresponding to such a region/image in electronic form, e.g. in a render target, such as a frame buffer.

Figure 12:
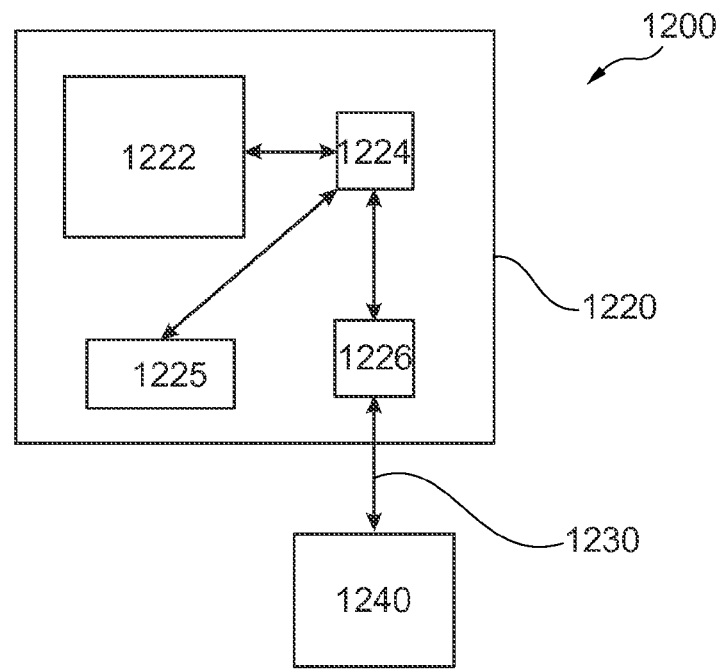
FIG. 12 illustrates an exemplary system in which the operations described for FIGS. 1A-11 finds utility in accordance with the present invention.

FIG. 12 illustrates an exemplary system 1200 in which the methods described for FIGS. 1A-11 finds utility in accordance with the present invention. The system 1200, exemplary a computer system, includes a graphics processing subsystem 1220 and an output device 1240, such as a monitor or printer. The graphics processing sub-system 1220 includes a processor 1222, a memory interface 1224, a frame buffer 1225, and a scanout processor 1226. The processor 1222 is operable to perform any or all of the operations described for FIGS. 1A-7 herein, and is a parallel processing architecture in an exemplary embodiment. A frame buffer 1226 is operably coupled to the processor 1222 for receiving rasterized and/or raytraced fragment values for each frame, and for reading out a composite image of each frame to the output device 1240 via memory interface 1224 and link 1230 (e.g., a DVI link). In a specific embodiment, the processor 1222 is operable to carry out one, several, or all of the operations described for any one, several or more of FIGS. 1A-11. Further, the processor 1222 may include local memory operable to store instruction code for performing the methods described in FIGS. 1A-11. In an alternative embodiment, system 1200 may take on different forms (e.g., a personal digital assistant, an internet device, a mobile telephone, or other mobile device), and processor 1220 may be an embedded in such different systems. Further alternatively, the processor 1222 may take the form of an application specific integrated circuit or other hardware/firmware circuit operable to carry out the operations described for any one, several, or all of FIGS. 1A-11.

In one embodiment, system 1200 is operable to reduce the number of samples tested for rendering a region of an image in accordance with the present invention. In this embodiment, the system 1200 includes a processor 1222 operable to perform one or more of the operations described for FIG. 11, and one or more of the operations described for FIG. 12.

As readily appreciated by those skilled in the art, the described processes and operations may be implemented in hardware, software, firmware or a combination of these implementations as appropriate. In addition, some or all of the described processes and operations may be carried out as a computer-implemented method, or as computer readable instruction code resident on a computer readable medium, the instruction code operable to control a computer of other such programmable device to carry out the intended functions. The computer readable medium on which the instruction code resides may take various forms, for example, a removable disk, volatile or non-volatile memory, etc.

In a particular embodiment of the invention, a memory (which may be included locally within the processor 1222 or globally within system 1200) is operable to store instructions for performing any of the operations described for FIGS. 1A-11. The memory may take various forms, e.g., a removable disk, an embedded memory, etc., in volatile or non-volatile form, and may be included within a variety of different systems, e.g. a computer system, an embedded processor, a graphics processor, or graphics processing sub-system, such as a graphics card.

Figure 13:
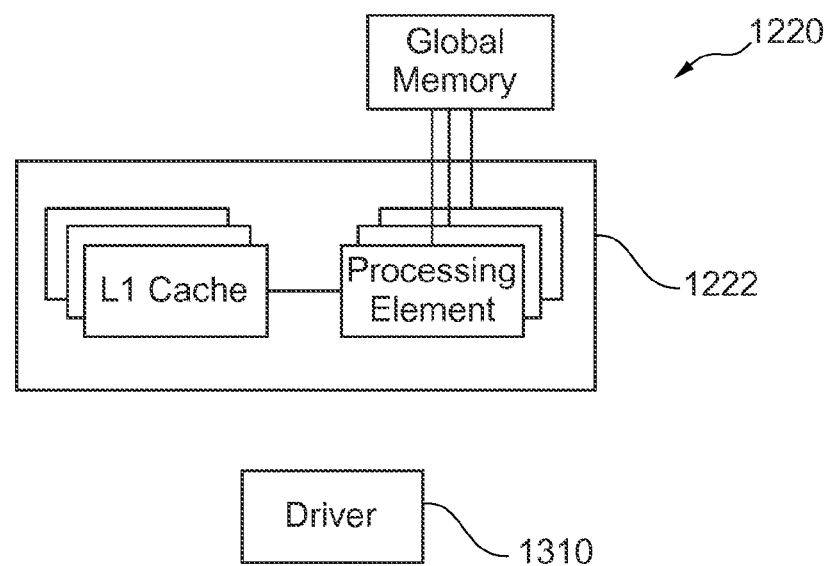
FIG. 13 illustrates an exemplary graphics processing subsystem shown in FIG. 12 in accordance with the present invention.

FIG. 13 illustrates an exemplary graphics processing sub-system 1220 of FIG. 12 in accordance with the present invention. The graphics processing sub-system 1220 includes parallel processing elements and their associated local L1 caches, as well as a global memory block which is operable to store instructions for carrying out the methods described for FIGS. 1A-11. The sub-system 1220 may further include one or more drivers 1310 for controlling the operation of the sub-system 1220 in accordance with the methods described herein. In one embodiment, the sub-system 1220 is included within in a graphics card. In another embodiment, the sub-system 1220 is included within the motherboard of a computer or workstation or on a game console. In another embodiment, the sub-system 1220 is realized in an embedded system, such as in a cellular telephone.

The terms "a" or "an" are used to refer to one, or more than one feature described thereby. Furthermore, the term "coupled" or "connected" refers to features which are in communication with each other, either directly, or via one or more intervening structures or substances. The sequence of operations and actions referred to in method flowcharts are exemplary, and the operations and actions may be conducted in a different sequence, as well as two or more of the operations and actions conducted concurrently. Reference indicia (if any) included in the claims serves to refer to one exemplary embodiment of a claimed feature, and the claimed feature is not limited to the particular embodiment referred to by the reference indicia. The scope of the clamed feature shall be that defined by the claim wording as if the reference indicia were absent therefrom. All publications, patents, and other documents referred to herein are incorporated by reference in their entirety. To the extent of any inconsistent usage between any such incorporated document and this document, usage in this document shall control.

The foregoing exemplary embodiments of the invention have been described in sufficient detail to enable one skilled in the art to practice the invention, and it is to be understood that the embodiments may be combined. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined solely by the claims appended hereto.

What is claimed is:

1. A method for reducing the number of sample points tested for rendering a screen space tile of an image, the method comprising:

constructing a trajectory of a primitive in screen space for an image which is to be rendered;

determining low and high bounds in a non-screen space dimension for the screen space tile of the image which is to be rendered by using screen space points of the trajectory of the primitive;

constructing an axis-aligned bounding box for the screen space tile of the image which is to be rendered by using the low and high bounds in the non-screen space dimension for the screen space tile, wherein the axis-aligned bounding box includes a first dimension that extends between the low and high bounds in the non-screen space dimension that are defined as a function of the trajectory of the primitive in the screen space, and wherein the axis-aligned bounding box overlaps a portion of the screen space tile; and excluding from testing, one or more sample points which are located within the screen space tile, and which are not overlapped by the axis-aligned bounding box.

2. The method of claim 1, wherein the axis-aligned bounding box includes a non-screen space dimension selected from the group consisting of time (t), horizontal lens dimension (u), and vertical lens dimension (v).

3. The method of claim 1, wherein said constructing a trajectory comprises:

forming a first screen space bounding rectangle to approximate the primitive at a first screen space position, the primitive at the first screen space position characterized by a first index in a non-screen space dimension;

forming a second screen space bounding rectangle to approximate the primitive at a second screen space position, the primitive at the second screen space position characterized by a second index in the non-screen space dimension; and constructing an interpolant between the first and second screen space bounding rectangles, the interpolant having a non-screen space dimension which is a function of the first and second non-screen space indices.

4. The method of claim 1, wherein said constructing a trajectory comprises:
approximating a primitive at respective first and second screen space positions using a plurality of line equations;
determining first and second line equation offsets for said line equations at the respective first and second screen space positions; and
constructing an interpolant between the first and second screen space positions as a function of the first and second offsets.

5. The method of claim 1, wherein said constructing a trajectory comprises:
determining a non-linear path which is traced by a vertex of a primitive, the non-linear path defined in accordance with a perspective correct motion approximation of the vertex;
determining a tangent point for the non-linear path of the vertex; and
extending a line through the tangent point of the non-linear path to a predefined non-screen space upper bound and to a predefined non-screen space lower bound.

6. The method of claim 1, wherein said constructing a trajectory comprises:
determining a non-linear bounding line which is traced by a vertex of a primitive, the non-linear bounding line defined in accordance with a perspective correct motion approximation of the vertex; and
extending the non-linear bounding line to intersect a predefined upper non-screen space bound and a predefined non-screen space lower bound.

7. A method for rendering a screen space tile of an image, comprising:
identifying a screen space tile which is to be rendered, the screen space tile including a plurality of sample points distributed thereover;
constructing a trajectory of a primitive in the screen space tile;
determining low and high bounds in a non-screen space dimension for the screen space tile by using screen space points of the trajectory of the primitive;
constructing an axis-aligned bounding box for the screen space tile by using the low and high bounds in the non-screen space dimension for the screen space tile, wherein the axis-aligned bounding box includes a first dimension that extends between the low and high bounds in the non-screen space dimension that are defined as a function of the trajectory of the primitive in the screen space, and wherein the axis-aligned bounding box overlaps a portion of the screen space tile;
excluding from testing, one or more sample points which are located within the screen space tile, and which are not overlapped by the axis-aligned bounding box;
testing the sample points which are located within the screen space tile and which are overlapped by the axis-aligned bounding box; and
rendering the screen space tile of the image based upon the tested sample points.

8. The method of claim 7, wherein the axis-aligned bounding box includes a non-screen space dimension selected from the group consisting of time (t), horizontal lens dimension (u), and vertical lens dimension (v).

9. The method of claim 7, wherein said constructing a trajectory comprises:
forming a first screen space bounding rectangle to approximate the primitive at a first screen space position, the primitive at the first screen space position characterized by a first index in a non-screen space dimension;
forming a second screen space bounding rectangle to approximate the primitive at a second screen space position, the primitive at the second screen space position characterized by a second index in the non-screen space dimension; and
constructing an interpolant between the first and second screen space bounding rectangles, the interpolant having a non-screen space dimension which is a function of the first and second non-screen space indices.

10. The method of claim 7, wherein said constructing a trajectory comprises:
approximating a primitive at respective first and second screen space positions using a plurality of line equations;
determining first and second line equation offsets for said line equations at the respective first and second screen space positions; and
constructing an interpolant between the first and second screen space positions as a function of the first and second offsets.

11. The method of claim 7, wherein said constructing a trajectory comprises:
determining a non-linear path which is traced by a vertex of a primitive, the non-linear path defined in accordance with a perspective correct motion approximation of the vertex;
determining a tangent point for the non-linear path of the vertex; and
extending a line through the tangent point of the non-linear path to a predefined non-screen space upper bound and to a predefined non-screen space lower bound.

12. The method of claim 7, wherein said constructing a trajectory comprises:
determining a non-linear bounding line which is traced by a vertex of a primitive, the non-linear bounding line defined in accordance with a perspective correct motion approximation of the vertex; and
extending the non-linear bounding line to intersect a predefined upper non-screen space bound and a predefined non-screen space lower bound.

13. A system operable to reduce the number of sample points tested for rendering a screen space tile of an image, the system including a processor operable to:
construct a trajectory of a primitive in screen space for an image which is to be rendered;
determine low and high bounds in a non-screen space dimension for the screen space tile of the image which is to be rendered by using screen space points of the trajectory of the primitive;
construct an axis-aligned bounding box for the screen space tile of the image which is to be rendered by using the low and high bounds in the non-screen space dimension for the screen space tile, wherein the axis-aligned bounding box includes a first dimension that extends between the low and high bounds in the non-screen space dimension that are defined as a function of the trajectory of the primitive in the screen space, and wherein the axis-aligned bounding box overlaps a portion of the screen space tile; and
exclude from testing, one or more sample points which are located within the screen space tile, and which are not overlapped by the axis-aligned bounding box.

14. The system of claim 13, wherein the processor is further operable to:
- form a first screen space bounding rectangle to approximate the primitive at a first screen space position, the primitive at the first screen space position characterized by a first index in a non-screen space dimension;
- form a second screen space bounding rectangle to approximate the primitive at a second screen space position, the primitive at the second screen space position characterized by a second index in the non-screen space dimension; and
- construct an interpolant between the first and second screen space bounding rectangles, the interpolant having a non-screen space dimension which is a function of the first and second non-screen space indices.

15. The system of claim 13, wherein the processor is further operable to
- approximate a primitive at respective first and second screen space positions using a plurality of line equations;
- determine first and second line equation offsets for said line equations at the respective first and second screen space positions; and
- construct an interpolant between the first and second screen space positions as a function of the first and second offsets.

16. A system operable to render a screen space tile of an image, the system comprising including a processor operable to:
- identify a screen space tile which is to be rendered, the screen space tile including a plurality of sample points distributed thereover;
- construct a trajectory of a primitive in the screen space tile;
- determine low and high bounds in a non-screen space dimension for the screen space tile by using screen space points of the trajectory of the primitive;
- construct an axis-aligned bounding box for the screen space tile by using the low and high bounds in the non-screen space dimension for the screen space tile, wherein the axis-aligned bounding box includes a first dimension that extends between the low and high bounds in the non-screen space dimension that are defined as a function of the trajectory of the primitive in the screen space, and wherein the axis-aligned bounding box overlaps a portion of the screen space tile;
- exclude from testing, one or more sample points which are located within the screen space tile, and which are not overlapped by the axis-aligned bounding box;
- test the sample points which are located within the screen space tile and which are overlapped by the axis-aligned bounding box; and
- render the screen space tile of the image based upon the tested sample points.

17. The system of claim 16, wherein the processor is further operable to:
- form a first screen space bounding rectangle to approximate the primitive at a first screen space position, the primitive at the first screen space position characterized by a first index in a non-screen space dimension;
- form a second screen space bounding rectangle to approximate the primitive at a second screen space position, the primitive at the second screen space position characterized by a second index in the non-screen space dimension; and
- construct an interpolant between the first and second screen space bounding rectangles, the interpolant having a non-screen space dimension which is a function of the first and second non-screen space indices.

18. The system of claim 16, wherein the processor is further operable to
- approximate a primitive at respective first and second screen space positions using a plurality of line equations;
- determine first and second line equation offsets for said line equations at the respective first and second screen space positions; and
- construct an interpolant between the first and second screen space positions as a function of the first and second offsets.

19. A computer program product, resident on a non-transitory computer-readable medium, and operable to store instructions for reducing the number of sample points tested for rendering a screen space tile of an image, the computer program product comprising:
- instruction code for constructing a trajectory of a primitive in screen space for an image which is to be rendered;
- instruction code for determining low and high bounds in a non-screen space dimension for the screen space tile of the image which is to be rendered by using screen space points of the trajectory of the primitive;
- instruction code for constructing an axis-aligned bounding box for the screen space tile of the image which is to be rendered by using the low and high bounds in the non-screen space dimension for the screen space tile, wherein the axis-aligned bounding box includes a first dimension that extends between the low and high bounds in the non-screen space dimension that are defined as a function of the trajectory of the primitive in the screen space, and wherein the axis-aligned bounding box overlaps a portion of the screen space tile; and
- instruction code for excluding from testing, one or more sample points which are located within the screen space tile, and which are not overlapped by the axis-aligned bounding box.

20. A computer program product, resident on a non-transitory computer-readable medium, and operable to store instructions for rendering a screen space tile of an image, the computer program product comprising:
- instruction code for identifying a screen space tile which is to be rendered, the screen space tile including a plurality of sample points distributed thereover;
- instruction code for constructing a trajectory of a primitive in the screen space tile;
- instruction code for determining low and high bounds in a non-screen space dimension for the screen space tile by using screen space points of the trajectory of the primitive;
- instruction code for constructing an axis-aligned bounding box for the screen space tile by using the low and high bounds in the non-screen space dimension for the screen space tile, wherein the axis-aligned bounding box includes a first dimension that extends between the low and high bounds in the non-screen space dimension that are defined as a function of the trajectory of the primitive in the screen space, and wherein the axis-aligned bounding box overlaps a portion of the screen space tile;
- instruction code for excluding from testing, one or more sample points which are located within the screen space tile, and which are not overlapped by the axis-aligned bounding box;
- instruction code for testing the sample points which are located within the screen space tile and which are overlapped by the axis-aligned bounding box; and
- instruction code for rendering the screen space tile of the image based upon the tested sample points.

* * * * *